United States Patent
Berlin et al.

(10) Patent No.: US 6,460,069 B1
(45) Date of Patent: Oct. 1, 2002

(54) SYSTEM AND METHOD FOR COMMUNICATING DOCUMENTS VIA A DISTRIBUTED COMPUTER SYSTEM

(75) Inventors: Leslie Berlin, Tampa; Russell Hawkins, Tampa; Matt Ullery, Odessa; Tim Jagodzinski, Riverview, all of FL (US)

(73) Assignee: Pegasus TransTech Corporation, Tampa, FL (US)

(*) Notice: Subject to any disclaimer, the term of this patent is extended or adjusted under 35 U.S.C. 154(b) by 0 days.

(21) Appl. No.: 09/267,298

(22) Filed: Mar. 15, 1999

(51) Int. Cl.$^7$ ............................................... G06F 15/16
(52) U.S. Cl. ........................... 709/201; 709/238; 705/1; 705/30
(58) Field of Search ................................. 709/201, 238; 705/1, 30

(56) References Cited

U.S. PATENT DOCUMENTS 5,168,444 A * 12/1992 Cukor et al. .................... 705/1
6,032,137 A *  2/2000 Ballard ......................... 705/75
6,097,834 A *  8/2000 Krouse et al. .............. 382/137

OTHER PUBLICATIONS

IBMDB vol. 29, issue No. 4; pp. 1526–1530 title Material Logistics System dated Sep. 1986.*

* cited by examiner

*Primary Examiner*—Ayaz Sheikh
*Assistant Examiner*—Frantz B. Jean
(74) *Attorney, Agent, or Firm*—King & Spalding

(57) ABSTRACT

Collecting document images at a remote data collection site and transmitting these document images to a selected data processing site via a distributed computer network in response to authorization by a central control system. A data communication system can communicate collected data between multiple data collection systems and one or more data processing systems via a distributed computer network, such as the global Internet or a framed network. The central control system, connected to the distributed computer network, can authorize the transmission of collected data from a data collection system to an identified data processing system. Information collected at a data collection system typically comprises electronic images of documentation. Document images can be generated by an image scanning device, such as a conventional scanner, in response to a user's selection of a control corresponding to the color of the document to be scanned. The selection of this color-coded control assigns a set of predetermined scanner parameters controlling image creation operations based on document color. This set of predetermined scanner parameters is specifically selected prior to field operations of a data collection system based upon empirical measurements that support a determination of the best scanner parameters for a particular document color.

31 Claims, 12 Drawing Sheets

SYSTEM AND METHOD FOR COMMUNICATING DOCUMENTS VIA A DISTRIBUTED COMPUTER SYSTEM

TECHNICAL FIELD

The present invention relates to communicating the content of paper documents via a distributed computer system, such as the global Internet. More particularly described, the present invention supports the collection of document images at a remote data collection site and the authorized transmission of these document images to a designated data processing site via a distributed computer network.

BACKGROUND OF THE INVENTION

Large truckload carriers rely upon hundreds and, in some cases, thousands of drivers to support the transportation of goods to sites located throughout the North American continent. A driver is typically assigned a shipping load and related documents and a shipper must obtain the signature of the consignee as evidence of load delivery. The transportation company can not bill the receiving party for transportation of the shipping load until the billing location of the transportation company receives the signed shipping documents. Consequently, the billing location of the transportation company requires the delivery of the signed shipping documents as quickly as possible to avoid a billing delay and a possible delay of payment collection.

The transportation industry has recognized that the billing process for transportation services can be expedited if signed shipping documents can be received from a driver as quickly as possible upon delivery completion. For example, a driver can drop off documentation at one of the transportation company's terminals typically located throughout the country. Although the delivery of the documentation to a terminal results in the delivery of the original signed documentation to the transportation company, these terminals typically operate in diverse geographical locations that may prevent convenient or efficient access by a driver. Moreover, only selected transportation companies operate a network of terminals that can accept such documentation from drivers. Consequently, the transportation industry has searched for other methods for delivering shipping documentation by drivers to a billing location of the transportation company.

Another approach to the delivery of shipping documentation is the use of conventional mail delivery options to forward the shipping documentation from a driver to a transportation billing center. For example, transportation industry members have instructed drivers to forward shipping documents to a transportation billing center via an overnight mail delivery service. Nevertheless, this mail delivery approach requires at least a single business day to achieve the delivery of the required shipping documentation. Once delivered to the transportation billing center, the shipping documents are manually handled on an individual basis to initiate billing operations. In view of the delays associated with conventional mail delivery of shipping documentation, members of the transportation industry have searched for a more efficient document delivery system to expedite their billing operations.

Another alternative document delivery approach is the use of facsimile transmission systems that enable a driver to "fax" shipping documents from an imaging center to a transportation billing center. Imaging centers are typically located at locations convenient to drivers, such as truck stops or freight terminals. Although a facsimile transmission of a shipping document can be quickly completed, the transportation industry has recognized that this document delivery mechanism suffers from quality control problems. Faxed documents can arrive at a transportation billing center in poor or illegible condition in the absence of quality control measures. Moreover, faxed documents must be manually handled on an individual basis because they arrive at the billing center without any index data that links the shipping document facsimile with certain shipment particulars required for the billing process.

In view of the foregoing, there is a need within the transportation industry for a document delivery system that supports the efficient and proper delivery of accurate document information from drivers to designated transportation billing centers. There is a further need for a document delivery system that would enable a transportation company to initiate the billing process immediately upon receipt of the shipping document information to minimize the account receivable period. There is a further need in the transportation industry for a document delivery system that allows drivers to efficiently transmit document information and related shipment index data to a transportation billing center to support an expedited billing process. The present invention addresses these and other needs of the prior art by allowing drivers to scan shipping documents, to obtain related index information, and to transmit the combination of document images and index information from a data collection site to the appropriate data processing site via a distributed computer network.

SUMMARY OF THE INVENTION

The present invention is directed to a data communication system for communicating collected information between multiple data collection systems and one or more data processing systems via a distributed computer network, such as the global Internet or a frame network. A central control system, connected to the distributed computer network, can authorize the transmission of collected information from a data collection system to a designated data processing system. The central control system can assign the designated data processing system to receive the collected information based upon an identifying characteristic for the source of information collected by the data collection system. The collected information typically comprises one or more images of documentation, which can be generated in response to scanning the document based upon the color of that document. The collected information transmitted by the data collection system can be supplemented with additional information to support subsequent processing operations, including indexing data related to document images generated at the data collection system.

Prior to initiating a communication of collected information, data source information can be input at a data collection system to support a verification task. This information typically identifies the identity and affiliation of the data source. The data source information can be transmitted via the distributed computer network to the central control system. Upon receipt, an inquiry can be conducted at the central control system to determine whether the data source is authorized to communicate with a particular data processing system. If so, the central control system transmits an authorization message, typically comprising the address of the designated data processing system and index information, to the data collection system. Based on this authorization, an end user is prompted at the data collection system to input requested information, such as document information. For example, the end user can input a document into the data collection system by the use of a conventional scanner. To ensure a high quality document image, the scanner parameters are automatically set prior to document image generation based upon the color of the document to be scanned. In turn, the data collection system can transmit the document information and index information to the designated data processing system via the distributed computer network.

For one aspect of the present invention, the data communication system can support the collection and delivery of documentation used by the transportation industry to document the delivery of a shipment and to support invoicing of the recipient of that shipment. For this transportation industry application, a data collection system can be housed within a kiosk installation and located in numerous truck stops and transportation terminals throughout a selected geographical area. Upon completion of a shipment delivery, a driver can complete the necessary shipping documentation that serves as evidence of the shipment delivery and thereafter travel to a convenient location to input the documentation into a kiosk-housed data collection system. To support the input of documentation, the data collection system typically comprises a computer having a network connection, a display device, an input device, and a scanning device or scanner for generating a document image. The driver can use the scanning device to create one or more document images for the shipping documentation. Although this scanning device is typically implemented by an optical image scanner, the scanning function also can be supported by other types of input devices, including bar code scanners, RF tag scanners, and digital cameras. Based on the identity of a data processing system provided by a central control system, the data collection system can transmit each document image to the identified data processing system. This data processing system, which typically represents a billing center for a transport carrier, can process each document image and any related information to support billing operations.

The driver can use a magnetic card, such as a "smart" card, encoded with data source information, typically the identity of the driver and the driver's company, to initiate an authorization task at the data collection system. The data collection system transmits the encoded information defining the data source to the central control system and, if the driver is authorized, the central control system can respond by sending an authorization message to the data collection system. This authorization message typically comprises the identity of a designated data processing system for receiving information collected by the data collection system and index information that provides one or more indexes for the collected information.

In response to a prompt presented by the display device, the driver can use the scanner to generate one or more document images of the shipping documentation. The data collection system can transmit these document images, accompanied by index information supplied by the central control system, to the designated data processing system via the distributed computer network. Consequently, the present invention allows a driver to use a data collection system located at a convenient location, such as a truck stop, to scan and index shipping documentation and to transmit an indexed document image to a designated transportation billing center, thereby expediting the billing process for the shipment delivery.

More particularly described, this transportation industry aspect of the present invention supports the efficient and accurate delivery of document images and related indexes from a data collection system to a designated transportation billing center. Advantageously, the data collection systems can be housed within kiosks located within truck stops that are conveniently located along transportation routes to enable a driver to easily reach a data collection site on the same day that a shipment delivery is completed by the driver. A driver can input driver-related information at a data collection system, typically by swiping a "smart" card having encoded driver information at a kiosk housing the data collection system. In the event that the driver desires to transmit documentation to a transportation carrier, the driver can select a document delivery application from a menu displayed by a touch screen display of the data collection system. In response to the selection of the document delivery application, the encoded driver information is passed to this application for forwarding to a central control system.

The document delivery application, operating at the data collection system, communicates with a central database server of the central control system to determine whether the driver is authorized to send document information to a transportation billing center. In the event that the driver information matches a record maintained by the central database server, the central control system transmits an authorization message to the data collection system via the distributed computer network. This authorization message typically comprises the address for a particular transportation billing center logically associated with the driver and index information.

In response to the authorization message, the data collection system can present a display screen that prompts the driver to input certain document-related information, such as a PRO number and document type. Upon completion of data entry by the driver, the data collection system can present a display screen prompting the driver to input a document by using a scanner to create a document image. Because the creation of an accurate document image by a scanner is sensitive to the color of the document, this display screen prompts the driver to select a control labeled with the color of the document to be scanned prior to enabling scanner operation. This selection of a control associated with the color of the document to be scanned determines the scanner parameters for use during the scanning operation. A document image is created by scanning the document in response to selecting this control on the touch screen display. This image can be presented to the driver for acceptance or rescanning prior to delivery of the document image to the designated transportation billing center. Additional documents can be scanned in a similar fashion prior to a transmission of one or more document images to the designated transportation billing center. Upon completion of scanning operations, the data collection system can print a receipt for the driver to confirm the data collection task.

The document image created by the scanning operation at the data collection system represents an accurate image that exceeds the quality associated with a typical facsimile transmission because the scanner parameters are determined by the driver's selection of a control associated with the document color. Moreover, the driver has the ability to perform a visual inspection of the document image prior to accepting that document image for transmission to the designated transportation billing center. In the event that the driver determines that the document image is not satisfactory, the scanner parameters can be readjusted by the driver and the document can be scanned again for review by the driver.

The data collection system can use information received from the central control system to prepare a message for forwarding one or more document images to the designated transportation billing center. In particular, the document delivery application can combine the document image(s) with index information to form a message for delivery to the address provided by the central control system. The data collection system can transmit this document message via a distributed computer network to the transportation billing center having that address. In this manner, the data collection system can automatically route the document images to a selected data processing site based upon address information provided by the central control system. This address information is typically obtained by searching a database at the central control system based upon the identity of the driver or the identity of the driver's company. This enables the proper routing of the document images to the correct recipient via the distributed computer network. Moreover, this search of the central database also can result in the retrieval of index information that can be provided to the data collection system to support the indexing of the document images.

A message queue typically receives the document message at the designated transportation billing center. The message queue passes the data message to an extraction system for routing of the indexed document images to an electronic document management system. These indexed document images facilitate billing operations conducted by the transportation billing center.

In summary, the present invention advantageously provides a data communications system for collecting and delivering indexed images of documentation required by the transportation industry to support billing operations. That the present invention improves over the drawbacks of the prior art and accomplishes the objects of the present invention will become apparent from the detailed description of the exemplary embodiments to follow and the appended drawings and claims.

DETAILED DESCRIPTION OF THE EXEMPLARY EMBODIMENTS

Figure 1:
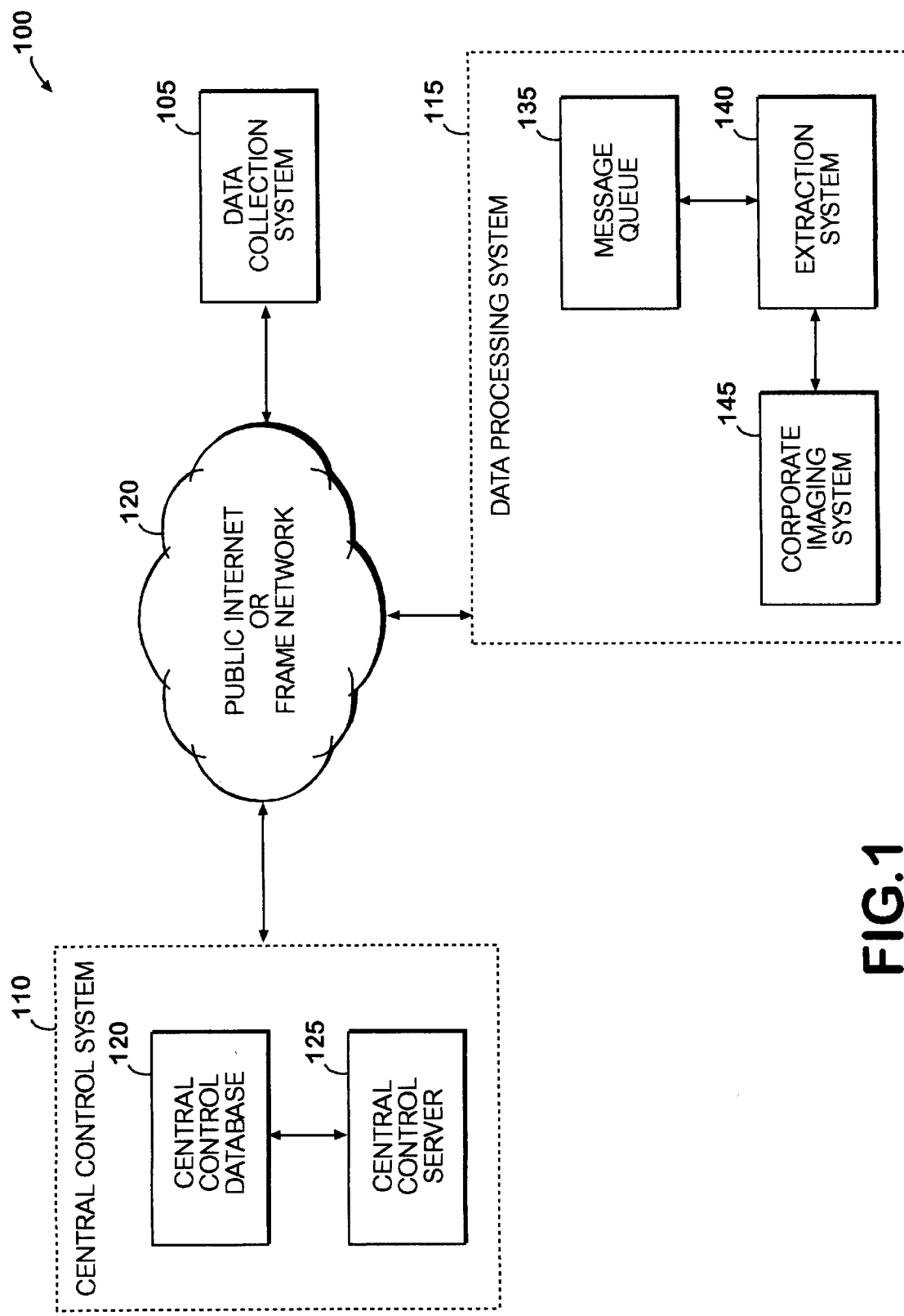
FIG. 1 is a block diagram of a data communication system constructed in accordance with an exemplary embodiment of the present invention.

The present invention is directed toward a system and method for collecting information at one or more data collection sites and delivering the collected information to a designated data processing site via a distributed computer network, such as the global Internet or a frame network. The data collection site can route the collected information to the proper recipient based upon information obtained from a central control system, which is typically located at a site that is geographically separated from the data collection site. In response to data source information collected at the data collection site, the central control system can locate an address for a particular data processing system designated to receive collected information and index information. In an illustrative embodiment, the data communication system of the present invention is embodied within a client-server architecture for collecting and transmitting information for documentation used by the transportation industry to document load delivery and billing operations.

For this exemplary document delivery embodiment, a driver can use a conveniently located data collection system to input certain source information, such as driver and company identities, by using a conventional input device, typically a magnetic card with encoded source information. The data collection system can transmit this data source information to a central database server at a central control system. Because the central control system is connected to the data collection system via a distributed computer network, the central control system can be geographically separated from one or more data collection systems. A search is conducted at the central database server to locate one or more records that match the source information transmitted by the data collection system. In the event that the central database server maintains information confirming that the driver is authorized to use the data collection system, then the central database server can prepare and transmit an authorization message. A representative authorization message includes the identity of a selected data processing system and indexing information. The central database server can send the authorization message to the data collection system via the distributed computer network.

In response to the authorization message, the data collection system can display a prompt that instructs the driver to scan the transportation industry-related documentation by using a scanner associated with the data collection system. Significantly, this prompt instructs the driver to select a scanner control corresponding to the color of the document to be scanned prior to initiating the scanning operation. Each color option is associated with a predetermined set of scanner parameters that define the preferred settings for the scanner to produce a high quality document image based on the corresponding document color. In the event that the driver accepts the document image created by the scanning operation, the data collection system can transmit document information, including the document image and associated indexing information, to the data processing system previously identified by the communication with the central control system. This enables the efficient and prompt delivery of documentation from the driver to a transportation billing center to expedite billing operations by the transportation carrier.

Although the exemplary embodiments of the present invention will be described in the context of a document collection and delivery system for the transportation industry, those skilled in the art will recognize that the present invention may be used in connection with the communication of data for other types of industries. The communication of information collected by an illustrative embodiment is supported by a distributed computing environment, in which program modules may be physically located in different local and remote memory storage devices. Examples of distributed computing environments include the global Internet, frame networks, and local and wide area networks.

In view of this illustrative distributed computing environment, the detailed description that follows presents the exemplary embodiments in terms of processes and symbolic representations of operations by conventional computer components. These components can include a computer having at least one processor and resident memory, an output display device, and input devices, including a mechanism for capturing the image of a document, such as a scanner or digital camera. The processes and operations performed by the computer include the manipulation of signals by a processor and the maintenance of signals within data structures resident in one or more memory storage devices.

For the purposes of this discussion, a process is generally conceived to be a sequence of computer-implemented steps leading to a desired result. These steps require physical manipulation of physical quantities. Usually, though not necessarily, these quantities take the form of electrical, magnetic, or optical signals capable of being stored, transferred, combined, compared, or otherwise manipulated. It is convention for those skilled in the art to refer to representations of the signals as information, images, files, characters, data, or the like. It should be kept in mind, however, that these and similar terms are associated with appropriate physical quantities for computer operations. These terms are merely conventional labels applied to physical quantities that exist within and during operation of the computer. Moreover, the operations described herein are machine operations performed in conjunction with various input provided by a human operator, such as a driver within the transportation industry, that interacts with the computer.

Referring now to the drawings, in which like numerals represent like elements throughout the several figures, aspects of the present invention and the illustrative operating environment will be described. FIG. 1 and the following discussion are intended to provide a brief, general description of a suitable computing environment in which the data communication invention may be implemented. Referring now to FIG. 1, a data communication system 100 comprises at least one data collection system 105, a central control system 110, and at least one data processing system 115. Each system is connected for computer communications via a distributed computer network 120, such as the global Internet or a frame network.

Although the illustrative operating environment shown in FIG. 1 presents a single data collection system to illustrate the operating aspects of the invention, it will be appreciated that the typical data communication application supported by the present invention will typically include numerous data collection systems operating in different geographical locations. Likewise, the data communications system 100 can include multiple data processing systems, each representing a different processor of data received via the distributed computer network 120. Although the present invention is preferably implemented with a single central control system 110, those skilled in the art will appreciate that this central control system can be implemented by a distributed system of computers operating in different geographical locations and sharing access to a central database.

In general, the central control system 110 can authorize the data collection system 105 to send collected information to a particular data processing system 115. The central control system 110 can complete this authorization operation in response to receiving information about the user from the data collection system 105. Based upon information identifying the user, the central control system 110 can determine the address for communicating with a particular data processing system 115 logically associated with that user. In addition, the central control system 110 also can locate additional information to support data collection and subsequent data processing operations based upon the user's identifying information. For example, this additional information can include a definition of text and data entry fields that support data entry operations by a user at the data collection system 105. This additional information also can include index data that support indexing of information collected at the data collection system 105, such as documentation indexes.

In response to an authorization message comprising the address of the designated data processing system and any supplemental information, the data collection system 105 can accept information input by the user and forward that information to the designated data processing system 115. In this manner, a user of the data collection system 105 can send information for processing by a data processing system 115 without any prior knowledge of communication paths or the identity of that data processing system. The data processing system 115 can conduct data processing operations in response to receiving one or more messages containing information collected by the data collection system 105 and the supplemental information provided to that data collection system by the central control system 110.

For the exemplary application of transporting documentation within the transportation industry, a driver or trucker can locate a data collection system 105 after completing delivery of a shipment and obtaining the necessary signature(s) for the shipping documentation describing that delivery. The data collection system 105, which is preferably implemented within a kiosk-styled housing, is typically located in a truck stop or trucking terminal along a transportation route frequented by members of the transportation industry. By swiping a magnetic card, typically described as a "smart" card, through a card reader, the driver can supply the data collection system 105 with data source information encoded on that magnetic card. This encoded information typically identifies the driver and the driver's trucking company, typically by unique alphanumeric identifiers. In the alternative, the driver can enter an identifying characteristic associated with that driver by the use of an input device at the data collection system 105, such as a keyboard or touch-screen pad. For the representative example of the transportation industry application, the data source information output by a data collection system is listed in Table 1.

TABLE 1

Data Source Information

Company Number
Driver Number
Kiosk Identifier
Date (Month/Date/Year)
Time (0000–2400 Hours)

As illustrated in Table 1, the data collection system 105 can generate a data source message comprising both source-related information and local data, such as the identifier for the collection system and the date/time for the message transmission.

In response to this encoded information, the data collection system 105 can log-in to the central control system 110 via the distributed computer network 125 and request authorization to conduct data collection operations. A central control server 120 receives this log-in request and extracts the driver-related and local information to support a search of a central control database 130. Based on the driver-related information, the records of the central control database 130 are searched to determine whether the identified trucking company and/or driver is authorized to use the data collection system 105 to forward transportation industry documentation to a selected data processing system 115.

If the driver is an authorized user of the data communication system 100, the central control server 125 can prepare an authorization message comprising one or more addresses for contacting a selected data processing system 115 associated with the identified trucking company or driver. Each address provides a unique identifier for establishing a computer connection with a computer at the identified data processing site. For example, typical addresses include primary and secondary Transport Control Protocol/Interface Program (TCP/IP) addresses and primary and secondary message queue name addresses. This authorization message also can include supplemental information, such as document indexing information, which is useful for the processing of collected document information. The supplemental information also can include preferences of the selected data processing system for particular types of information to be collected by a data collection system, such as a PRO number or a unique transaction identifier. The central control server 125 forwards this authorization message to the data collection system 105 via the distributed computer network 120.

Representative information supplied by the central control system to the data collection system in an authorization message is listed in Table 2.

TABLE 2

Image File Type
Company Label
Document Type Label
Valid Document Types
TCP/IP Address 1
TCP/IP Address 2
Message Queue (MSMQ) Name 1
Message Queue (MSMQ) Name 2

This information can also define text/graphics and one or more data fields for completion by a user at the data collection system 105 in response to a prompt for such information by a display screen.

In response to the authorization message, the data collection system 105 enters a data acquisition mode and presents a prompt that instructs the driver to enter certain document-related information, such as the PRO number or a unique identifier for the transaction. In addition, the data collection system 105 can present a prompt that instructs the driver to input one or more documents into the data collection system 105 for subsequent forwarding to a transportation billing center requiring such documentation. As described in more detail below with respect to FIG. 2 and FIGS. 3A and 3B, the driver can enter data via a touch-screen display and can input each document by using a conventional scanner to create a document image based on the color of the document to be scanned. Upon the successful entry of document information, the data collection system 105 can prepare a document message for transmission to the designated data processing system 115 via the distributed computer network 120.

A message queue 135 can receive the document message output by the data collection system 105 and process that message for submission to an extraction or router system 140. The extraction system 140 can process the document message by extracting each document image and other document-related information, such as indexing information. In turn, the extraction system 140 can pass the extracted information to a document imaging system 145 to complete the processing of each document image. The data processing system 115 is typically operated at a transportation billing center for the transportation carrier associated with the driver that inputs document information at the data collection system 105.

The computer network connections for each data collection system 105, the central control system 110, and each data processing system 115 can be implemented by a frame relay connection. Each of the systems is supported by one or more conventional computers running a TCP/IP protocol stack. A representative example of a computer system capable of supporting the components of the data communication system 100 is a computer having one or more processors, random access memory (RAM)-supported system memory, CD-ROM, hard disk, and/or flexible disk drives, and computer network connections, such as an Ethernet network interface.

To support data communication operations, the central control system 110 includes a control computer database 130 that maintains a variety of archival records. These records generally include information identifying authorized users (and their companies) of the data collection systems 105, the addresses of data processing systems 115 and their relationship to authorized drivers, the log-on records documenting the transactions of the data collections systems 105, and the providers and locations for data collection systems 105. Representative records and associated fields for an exemplary central collection system 110 are shown below in Table 3.

TABLE 3

Central Computer Database Records and Record Fields

Customer (this will be used as
default for new companies under
this customer)

| | | |
|---|---|---|
| Customer Number | Integer | KEY (must be unique) |
| Customer Name | Text(50) | |
| Address1 | Text(50) | |
| Address2 | Text(50) | |
| City | Text(50) | |
| State/Province | Text(10) | |
| Zip | Text(15) | |
| Country | Text(40) | |

TABLE 3-continued

Central Computer Database Records and Record Fields

| Field | Type | Notes |
|---|---|---|
| LanguageCode | Byte | (0=US English; 1=French; 2=Spanish; 3=German) |
| Password | Text(15) | |
| Technical Contact | Text(30) | |
| Technical Contact Phone Number | Text(20) | |
| Technical Contact Emergency Number | Text(20) | |
| Driver Support Phone Number | Text(20) | |
| Company | | |
| Customer Number | Integer | KEY |
| Company Number | Integer | KEY (two fields combined must be unique) |
| Company Name | Text(50) | |
| Address1 | Text(50) | |
| Address2 | Text(50) | |
| City | Text(50) | |
| State/Province | Text(10) | |
| Zip | Text(15) | |
| Country | Text(40) | |
| LanguageCode | Byte | (0=US English; 1=French; 2=Spanish; 3=German) |
| Technical Contact | Text(30) | |
| Technical Contact Phone Number | Text(20) | |
| Technical Contact Emergency Number | Text(20) | |
| Driver Support Phone Number | Text(20) | |
| Company Default Settings | | |
| Customer Number | Integer | KEY |
| Company Number | Integer | KEY (two fields combined must be unique) |
| Primary MSMQ Address | Text(30) | |
| Secondary MSMQ Address | Text(30) | |
| Primary MSMQ Queue | Text(30) | |
| Secondary MSMQ Queue | Text(30) | |
| Primary Email Address | Text(30) | |
| Secondary Email Address | Text(30) | |
| Primary Error Notification Email Address | Text(30) | |
| Secondary Error Notification Email Address | Text(30) | |
| Primary SMTP Server Address | Text(30) | |
| Secondary SMTP Server Address | Text(30) | |
| Use Pro Number | Boolean | |
| Use Doc Type | Boolean | |
| Use Bar Code | Boolean | |
| PBS Database | Text(50) | |
| PBS FileType | Text(20) | |
| PBS InsertOrder | Text(100) | (max of 21 separated numbers) |
| Company Fields | | |
| Customer Number | Integer | KEY |
| Company Number | Integer | KEY |
| Field Name | Text(50) | KEY (three fields combined must be unique) |
| Card Scan Info Position | Integer | |
| Prompt User | Boolean | |
| Prompt Input Mask | Text(255) | |
| Bar Code Detection | Boolean | |
| Bar Code Regular Expression | Text(255) | |
| Special Field Flag | Text(1) | (P=Pro Number; D=Doc Type) |
| Company Document Types | | |
| Customer Number | Integer | KEY |
| Company Number | Integer | KEY |
| Document Type Code | Text(255) | KEY (three fields combined must be unique) |
| Description | Text(50) | |
| Driver | | |
| Customer Number | Integer | KEY |
| Driver Number | Integer | KEY (two fields combined must be unique) |
| Driver Name | Text(50) | |
| Card Number | Text(50) | |
| Driver Extended Info/Settings | | |
| Customer Number | Integer | KEY |
| Driver Number | Integer | KEY (two fields combined must be unique) |
| Primary MSMQ Address | Text(30) | |
| Primary MSMQ Queue | Text(30) | |
| Primary Email Address | Text(30) | |
| Primary SMTP Address | Text(30) | |
| Log | | |
| Log ID | Text(36) | KEY |
| Session ID | Text(36) | Equal to the UniqueID of the login packet (if a session is established) or the UniqueID of the log packet otherwise. |
| Origination Client ID | Integer | |
| Local DateTime | DateTime | (in GMT) |
| Local Time Zone | Text(31) | |
| GMT Adjustment | Byte | (Stored as GMT Adjustment + 24) |
| Log DateTime | DateTime | |
| Log Code | Integer | |
| Description | Text(50) | |
| Client | | |
| Client ID | Integer | KEY |
| Client Type | Text(1) | |
| Kiosk Location ID | Integer | |
| Kiosk Provider | Integer | |
| Client Description | Text(50) | |
| Data Collection System Providers | | |
| Kiosk Provider Number | Integer | KEY |
| Provider Name | Text(50) | |
| Address1 | Text(50) | |
| Address2 | Text(50) | |
| City | Text(50) | |
| State/Province | Text(10) | |
| Zip | Text(15) | |
| Country | Text(40) | |
| Technical Contact | Text(30) | |
| Technical Contact Phone Number | Text(20) | |
| Technical Contact Emergency Number | Text(20) | |
| Data Collection Locations | | |
| Kiosk Location ID | Integer | KEY |
| Kiosk Location Description | Text(100) | |
| Kiosk Location Address1 | Text(50) | |
| Kiosk Location Address2 | Text(50) | |
| Kiosk Location City | Text(50) | |
| Kiosk Location State/Province | Text(10) | |
| Kiosk Location Zip | Text(15) | |
| Kiosk Location Country | Text(40) | |
| Kiosk Location Contact | Text(30) | |
| Kiosk Location Phone Number | Text(20) | |

TABLE 3-continued

Central Computer Database Records and Record Fields

| | |
|---|---|
| Kiosk Location Fax Number | Text(20) |

Figure 2:
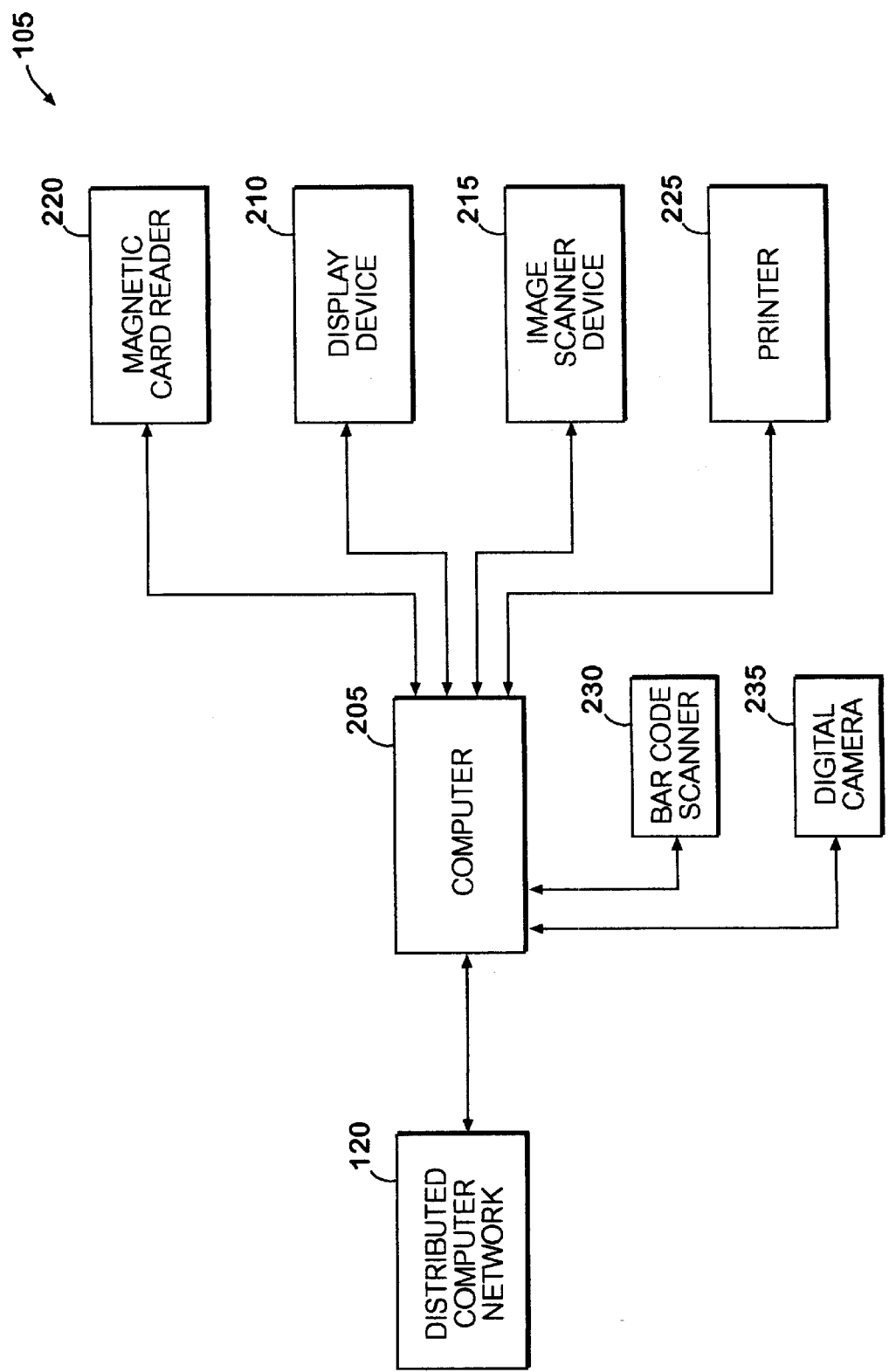
FIG. 2 is a block diagram illustrating the primary components of an exemplary data collection system for the data communication system illustrated in FIG. 1.

FIG. 2 is a block diagram that illustrates the primary components of an exemplary embodiment for the data collection system 105. Focusing on the transportation industry application, the data collection system 105 is preferably implemented in a kiosk-styled housing located at a truck stop or transportation terminal that can be conveniently accessed by members of the transportation industry. In this exemplary embodiment, the data collection system 105 comprises a computer 205 connected to a display device 210, an image scanner device 215, and the distributed computer network 120. The computer 205, the display device 210, and the image scanner device 215, as well as the computer network connection, can be implemented by conventional computer components. The data collection system 105 also can include a magnetic card reader 220 for accepting encoded information contained on a magnetic card or "smart" card, a printer 225 for printing a receipt or a report for the end user, and a bar code scanner 230 and digital camera 235 to provide alternative devices for inputting image-type data. The display device 210 preferably supports touch-screen operations to enable the user to enter information into the computer 205 by touching certain areas of the display screen of the display device 210 corresponding to a keypad, buttons or controls.

The computer 205 controls data collection operations and communications conducted via the distributed computer network 120. In addition, the computer 205 creates and maintains a log or record of data collection and communication operations attempted by the data collection system 105. Records can be maintained by the computer 205 to document both successful and unsuccessful data collection tasks and data communication tasks. The data collection system 105 can transmit this log information to the central control system 110, thereby creating an archival record of such operations and delivering present status data for review at the central control system site. Based on limited memory resources of the computer 205, the local log information can be deleted or overwritten after the successful transmission of this log to the central control system 110. Because the communications link between the data collection system 105 and the central control system 110 is bi-directional, the central control system can "ping" one or more data collection systems to inquire about the present status of these components or to request local log information. Applications and updates also can be delivered by the central control system 110 to one or more data collection systems 105 via this bi-directional computer network path.

The computer 205 can communicate with the display device 210 to present display screens that prompt a driver to (1) input requested document-related information, (2) scan a document, (3) review a document image resulting from a document scanning operation, and (4) accept or reject the document image. Representative display screens will be described below in connection with FIGS. 3A and 3B. A data entry display screen, shown in FIG. 3A, can prompt the driver to enter requested information within display fields, such as a PRO number, which represents a transportation company's unique tracking number for a transaction. A scanning display screen, shown in FIG. 3B, can prompt the driver to identify the type of document to be scanned and to create an image of the document based upon placement of the document within a scanner and selection of a control button corresponding to the color of that document.

The computer 205 also communicates with the image scanner device 215, also commonly described as a scanner, to support the collection of digital images of paper documentation for eventual transmission to a transportation billing center identified by the central control system. For a document scanning operation, the control parameters for the image scanner device 215 are preferably defined by a set of predetermined scanner parameters that correspond to the color of the document to be scanned. Based on prior empirical measurements, this set of predetermined scanner parameters supports the creation of a high quality image for that documentation color. This set of predetermined scanner parameters can be automatically selected for the scanning operation in response to the driver selecting a control corresponding to the document color and presented by a display screen on the display device 210.

Figure 3A:
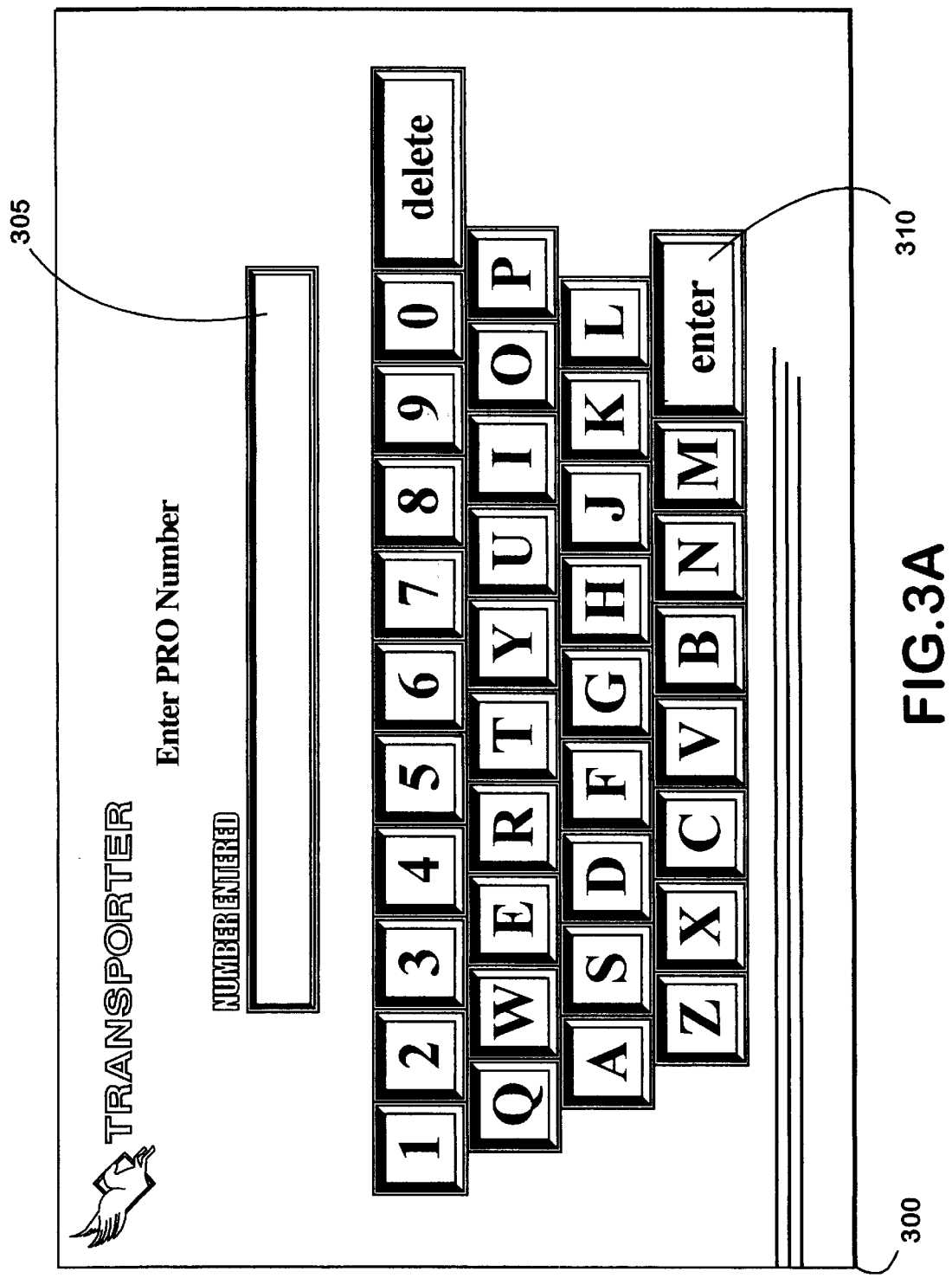
FIGS. 3A and 3B, collectively described as FIG. 3, are illustrations of exemplary display screens presenting user interface displays for the data collection system illustrated in FIG. 2.
Figure 3B:
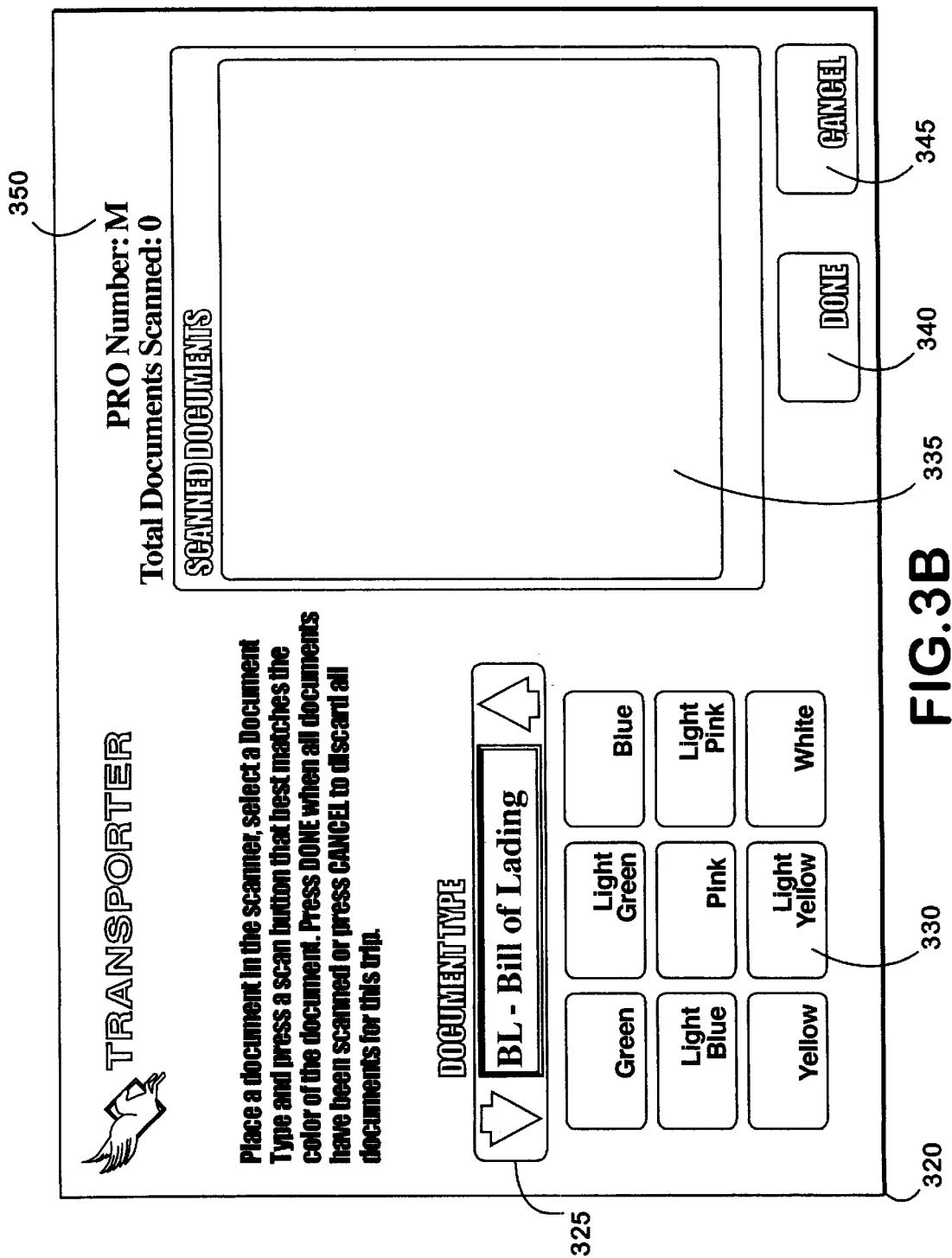

For example, the display device 210 can present the driver with a scanning display screen, such as the display shown in FIG. 3B, to prompt the driver to place a document in the image scanner device 215 and to select a touch-screen control button corresponding to the color of the document to be scanned. In response to the driver selecting the control button, the image scanner device 215 obtains the set of predetermined scanner parameters corresponding to that color and scans the document to create a document image. This document image can be presented within the scanning display screen for review by the driver. The driver can select another touch-screen control button presented by the scanning display screen to either accept or reject the document image.

Although the preferred embodiment utilizes a conventional image scanner device to create document images for collection and transmission by the data collection system 105, this image collection function can be supplemented by the use of the bar code scanner 230 or the digital camera 235. The bar code scanner 230 supports the reading of conventional bar code images, whereas the digital camera 235 can capture static or streaming video images in a digitized data format. For example, a driver can use a hand-held bar code scanner to scan bar code images on transportation documentation. Similarly, a driver could use the digital camera 235 to collect a digitally-formatted video image of a selected item, such as a transportation document, an insurance-related document, or other data items. Operation of the bar code scanner 230 can be further supplemented by the use of a radio frequency (RF) tag reader or scanner to obtain RF tag information.

Other input devices (not shown) for the data collection system 105 may include a microphone, joy stick, game pad, keyboard, pointing device, or the like. Input devices can be connected to the computer 205 via a variety of communication interfaces, such as a serial port, a parallel port, a game port, a universal serial bus, or a small computer system interface (SCSI). It will be appreciated that other types of communication ports or interfaces can be used to provide a connection between the computer 205 and a variety of input devices, such as the image scanner device 215, the magnetic card reader 220, the bar code scanner 230, or the digital camera 235. Moreover, the communication link supported by such communication interfaces can be implemented by wired or wireless communication links, such as RF, infrared, and cabled links.

The computer 205 includes system memory, including volatile and nonvolatile memory resources, for storing one or more application programs and an operating system. Although the preferred application program entitled "Transporter" is directed to the collection and transmission of document images, those skilled in the art will appreciate that this application also can include a form recognition function that supports automated document-type identification and optical character recognition (OCR) for data character entry. In view of the foregoing, it will be appreciated that the data collection system 105 can be extended to encompass other types of data entry and data collection to support a variety of applications requiring the collection and communication of data between at least two separate locations.

The operation of data entry and scanning operations conducted by the data collection system 105 are supported by a series of display screens presented by the display device 210 illustrated in FIG. 2. FIGS. 3A and 3B are illustrations of representative display screens that guide a driver through the operations of data entry and document scanning. Turning first to FIG. 3A, a display screen 300 is presented on the display device 210 in response to selecting the document delivery application. For this exemplary embodiment, the document delivery program is referred to as the "Transporter" application for use by members of the transportation industry. The display screen 300 supports entry by the driver of certain requested information based upon the use of a keypad 310, which corresponds to a touch-screen area for the display device 210. A data entry box 305 can display one or more alphanumeric characters selected by the driver in response to use of the keypad 310. These alphanumeric character(s) correspond to the requested PRO number. In response to the driver's selection of the "enter" key of the keypad 310, the PRO number is placed in system memory of the computer 205 prior to transmission of one or more related document images.

Turning now to FIG. 3B, which presents a representative display screen for scanning operations, a display screen 320 is presented to the driver upon completion of the entry of requested information at the display screen 300. The display screen 320, also described as the scanning display screen, supports the driver's selection of a document type for the document to be scanned, the color of the document to be scanned, and acceptance or rejection of a document image. The driver can manipulate a scrollable list 325 to select a document type that best matches the document to be scanned. In the representative display example, the driver has selected the document type "BL-bill of lading." As suggested by the "up" and "down" arrows of the scrollable list 325, the driver can scroll the list up or down by touching the location on the display screen corresponding to either the "up" arrow or the "down" arrow. In the event that the data collection system 105 includes the capability to use form recognition to identify a document type, then the manual selection of a document type via the scrollable list 325 can be eliminated from the data collection task.

After selecting the document type, the driver can press one of the control buttons 330 that best corresponds to the color of the document to be scanned. The labeled colors of the control buttons 330 correspond to the colors of standard documentation used by the transportation industry. The driver's selection of a control button 330 corresponding to a particular color will select the control parameters for use by the image scanner device 215 to scan the driver's document. Based on the selection of a single control button, the driver can effectively select a set of predetermined scanner parameters that support the creation of a high quality document image by the image scanner device based on document color.

The document is scanned in response to selection of the control button 330 and the resulting document image is presented within a document window 335 for review by the driver. If the driver accepts the document image, the driver can select the "DONE" button 330. Otherwise, the driver can select the "CANCEL" button 345 to reject the document image. This enables the driver to begin the scanning process anew based upon the selection of a control button 330 corresponding to a different (but typically related) color for that document.

To enable the driver to track the data collection operations, the display screen 320 presents tracking information 350, such as the PRO number entered by the driver and the Total Document Scan number. The driver is guided through document scanning operations by the instruction set presented in the left-hand top corner of the display screen 320.

Figure 4:
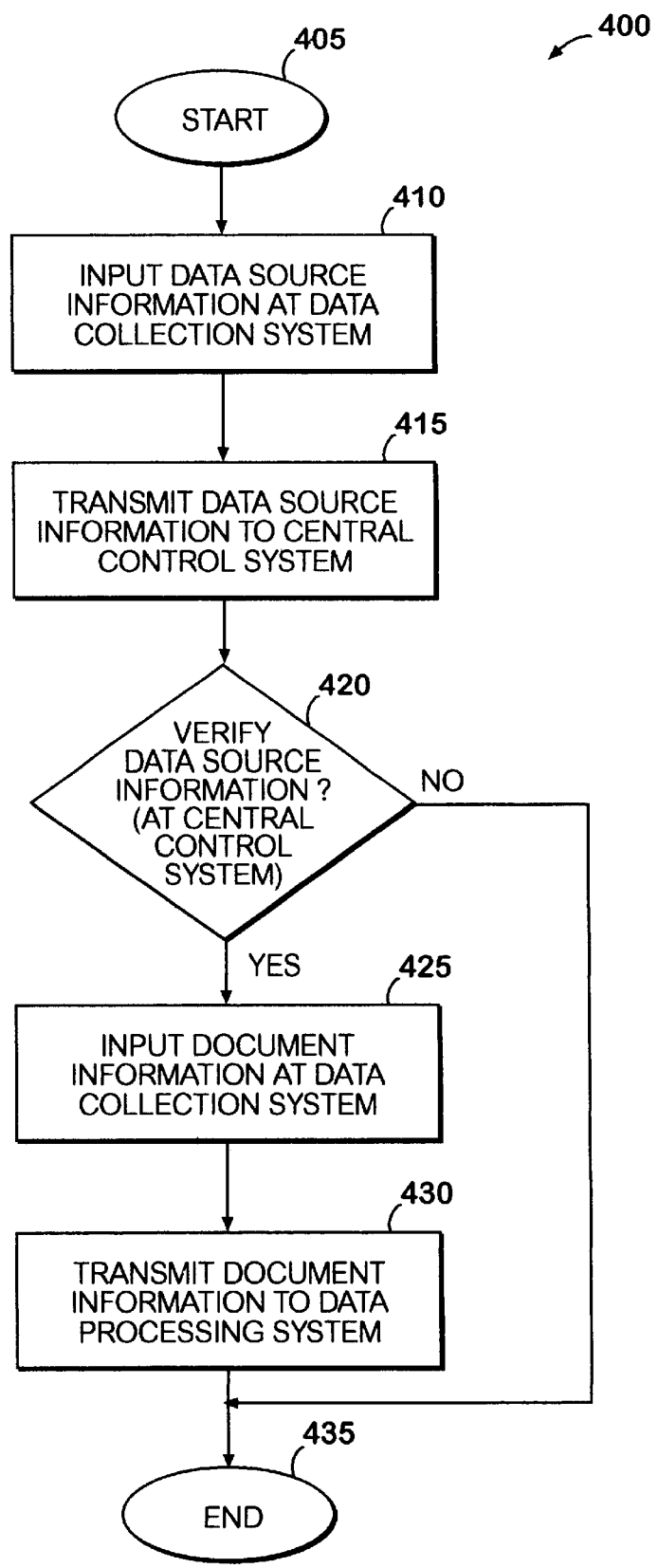
FIG. 4 is a logical flowchart diagram illustrating a computer-implemented process for communicating document-related information via a distributed computer network in accordance with an exemplary embodiment of the present invention.

FIGS. 4–9 are logical flowchart diagrams illustrating the computer-implemented processes completed by an exemplary embodiment of the present invention in support of data collection and communication operations for the representative application of document delivery within the transportation industry. Turning now to FIG. 4, a logical flowchart diagram is presented to illustrate the general tasks conducted by the data communications system 100 of FIG. 1. A method 400 begins at the START step 405 and proceeds to step 410, in which data source information is input at the data collection system 105. The data source information for the transportation industry application typically comprises the identities of the driver and the driver's company. This information can be conveniently encoded on a magnetic card conveniently carried by a driver for a company subscribing to the document delivery services supported by the data communications system 100. A driver can swipe the magnetic card through a card reader to input the encoded data source information to the data collection system 105. Those skilled in the art will appreciate that a wide variety of information can be input to the data collection system 105 in the step 410. Consequently, the present invention is not limited to the entry of driver-related information as described in connection with this exemplary embodiment.

In step 415, the data collection system 105 transmits the data source information, including any of the representative data shown in prior Table 1, to the central control system 110 via the distributed computer network 120. It will be understood that this transmission can include information other than the identity of the data source, such as the identity of the particular data collection system and network log-in data. Consequently, it will be appreciated that the transmission of data source information in step 415 can include additional data as needed for the operations conducted by the central control system 110.

In step 420, an inquiry is conducted at the central control system 110 to verify the data source information. Specifically, this inquiry is completed by conducting a search of the records of the central control database 130 to determine if the driver and/or the driver's company is an authorized user of the data communications system 100. The central control database 130 also maintains information defining one or more addresses for a particular data processing system 115 that can receive document-related information from a data collection system 105. In addition, the central control database 130 can maintain records defining indexing information that is useful for the processing of document-related information by a particular data processing system 115.

In the event that the data source information is verified in step 420, the "YES" branch is followed to step 425 and an authorization message is transmitted by the central control system 110 to the data collection system 105 via the distributed computer network 120. This authorization message typically comprises the address(es) of the specified data processing system, document indexing information, and a definition of data fields for completion by the user at the data collection system. Otherwise, the "NO" branch is followed from step 420 to step 435 and a failure message is transmitted by the central control system 110 to the data collection system 105 to terminate collection operations.

In step 425, a driver can enter document information to the data collection system 105. The driver can complete this data entry task by entering one or more alphanumeric characters to identify the transaction, such as a PRO number, selecting the document type for the document to be scanned, and completing the generation of a document image. As describe above in connection with FIGS. 2 and 3B, the driver can initiate the document image creation operation by selecting a control button that corresponds to the color of the document to be scanned. By pressing this control button on the touch-screen area of the display screen, the driver selects a set of predetermined scanner parameters that support the generation of a high quality document image based upon the corresponding color of that document.

The driver can enter data into the data collection system 105 by use of a variety of input devices, including a touch-screen display, keyboard, pointing device, or other conventional input mechanisms. Document image information can be input to the data collection system via an image scanner, a bar code scanner, an RF tag reader, a digital camera, and other types of input devices. Consequently, the data collection function in step 425 encompasses the acquisition of document information by use of input devices other than the preferred touch-screen display and the image scanning device. These input devices can be fixed to the kiosk-implemented data collection system or connected via a wireless or wired communications link for hand-held or portable data entry tasks.

The data collection system 105 can transmit the document information, including each document image and related indexing information, to the designated data processing system in step 430. This document information transmission is completed via the distributed computer network 120 and can include one or more images corresponding to documents scanned by the driver at the data collection system 105. The process 400 then terminates at the END step 435.

Figure 5:
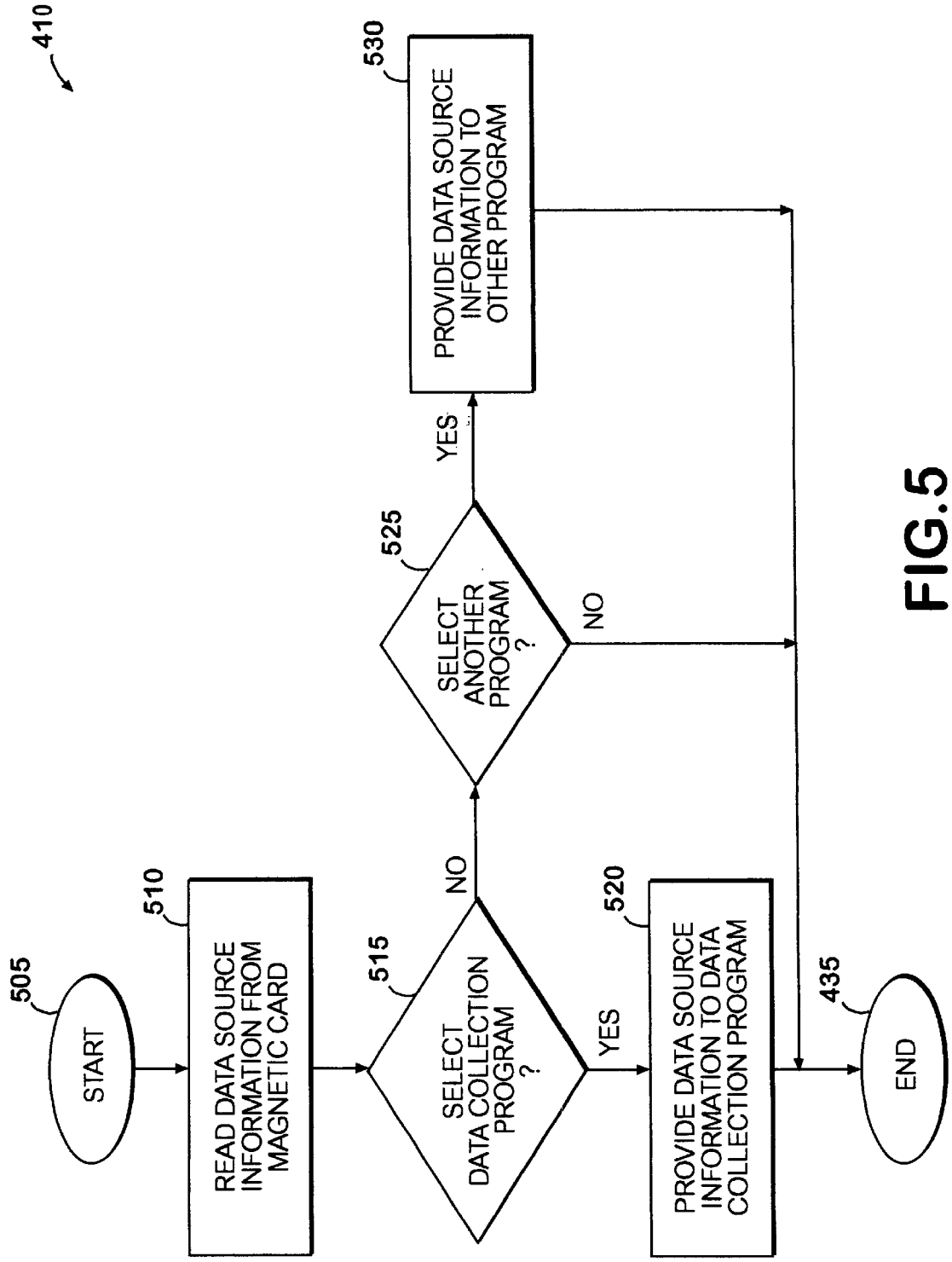
FIG. 5 is a logical flowchart diagram illustrating a computer-implemented process for obtaining data source information in accordance with an exemplary embodiment of the present invention.

FIG. 5 is a logical flowchart diagram illustrating an exemplary computer-implemented process for entering data source information during task 410 (FIG. 4). The computer-implemented process for task 410 is initiated at the START step 505 and proceeds to step 510, in which data source information is retrieved from an input device, such as a driver's magnetic card or other conventional input device, in response to a display screen prompt. Alternatively, the driver can enter a unique identifying characteristic via a touch-screen keypad. In step 515, an inquiry is conducted to determine whether the driver has selected the data collection application, commonly described as the "Transporter" application, from a display menu at the data collection system 105. If the response to this inquiry is negative, the "NO" branch is followed from step 515 to step 525. Otherwise, the "YES" branch is followed from step 515 to step 520 and the data source information is provided to the data collection application. In response to receiving the driver's identifying information, the data collection system 105 can transmit a request for log-in message, also described as a data source information message, to the central control system 110 via the distributed computer network 120. In the event that the data collection system 105 is unable to transmit the log-in request message, an error message can be stored within a local error log and a failure message can be presented to the user.

In step 525, an inquiry is conducted to determine whether the driver has selected another application option from the program menu at the data collection system 105. If so, the "YES" branch is followed to step 530, in which the data source information is provided to this selected program. If, however, the response to the inquiry in step 525 is negative, the "NO" branch is followed to the END step 535. Similarly, the process 410 proceeds to the END step 535 in response to completing the step 520 or the step 530. The process 410 is terminated at the END step 535.

Figure 6:
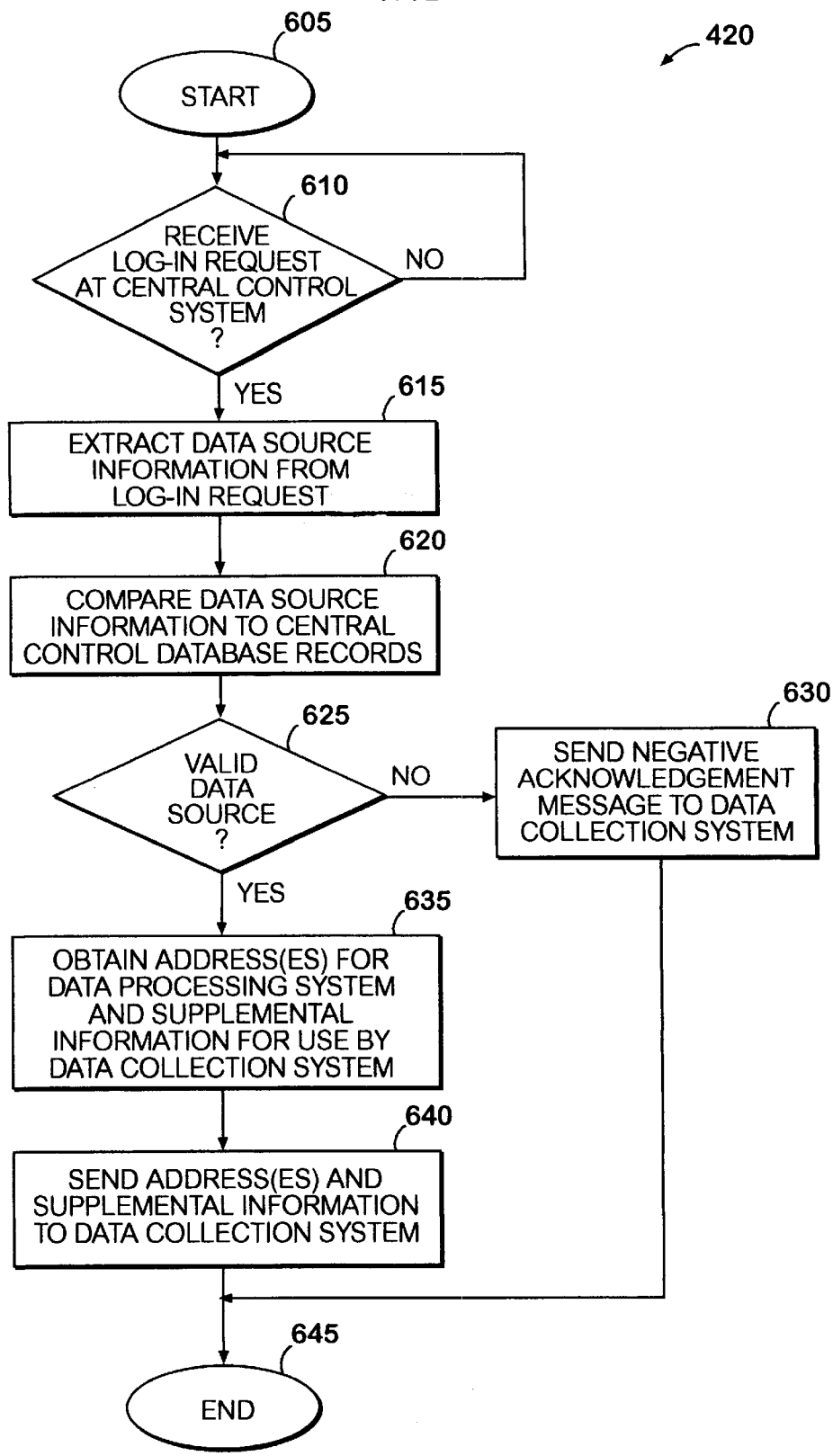
FIG. 6 is a logical flowchart diagram illustrating a computer-implemented process for communicating with a central control system and a data collection system in accordance with an exemplary embodiment of the present invention.

FIG. 6 is a logical flowchart diagram illustrating an exemplary computer-implemented process for completing the data source information verification task 420 (FIG. 4). The process 420 is initiated at the START step 605 and proceeds to step 610, in which an inquiry is conducted to determine whether a log-in request has been received by the central control system 110. If the response to this inquiry is negative, the "NO" branch is followed to step 605 and the process begins anew. Otherwise, the "YES" branch is followed from step 610 to step 615.

In step 615, a log-in request has been received from the data collection system 105 by the central control system 110. This log-in request includes data source information, which can be extracted by the central control system 110 in step 615. In turn, the extracted data source information is compared to records maintained by the central control system 110 in step 620. For example, if the data source information identifies a driver and the driver's company, this identifying data can be used to search the records of the central control system 110, If the central control database maintains one or more records that match this driver-related information, then a determination can be made whether that driver is authorized to use the data collection system 105 to collect and transmit document information to a particular data processing system 115.

In step 625, an inquiry is conducted to determine whether the data source associated with the data source information is valid. If so, the "YES" branch is followed to step 635 because the driver is an authorized user of the data communications system 100. Otherwise the "NO" branch is followed from step 625 to step 630. The central control system 110 transmits a negative acknowledgment message to the data collection system 105 in step 630 in response to a determination that the driver is not an authorized user. In response to this negative acknowledgment message, the data collection system 105 can notify the user about the unsuccessful log-in request and present the user with a telephone number or electronic mail address (if available) for the entity that he or she is attempting to contact in connection with the delivery of shipping documentation. For an exemplary embodiment, the data collection system 105 also can present the user with a problem code and a log identifier to deliver to the entity that he is she is attempting to contact. This information can be output to the printer 225 to provide the user with a printed record of this delivery problem. The method 420 then terminates at the END step 645.

Based on the determination that the driver is an authorized user, selected information maintained for that driver and the corresponding trucking company is obtained at the central control system 110 in step 635. This information typically includes one or more addresses for a particular data processing system 115 and indexing information for data to be collected at the data collection system 105. For the representative transportation industry application, the address information identifies the transportation billing center for the driver's trucking company and the indexing information defines one or more indexes that relate to documents that will be forwarded by the driver to the identified transportation billing center. Those skilled in the art will appreciate that other types of information can be obtained for the data source identified by the by the data collection system 105.

In step 640, the central control system 110 sends an authorization message to the data collection system 105 via the distributed computer network 120. This authorization message typically comprises an authorization command and the supplemental information previously obtained in step 635. This authorization message can be encrypted prior to transmission to ensure a secure communication between the central control system 110 and the data collection system 105. The process 420 then terminates at the END step 645.

Figure 7A:
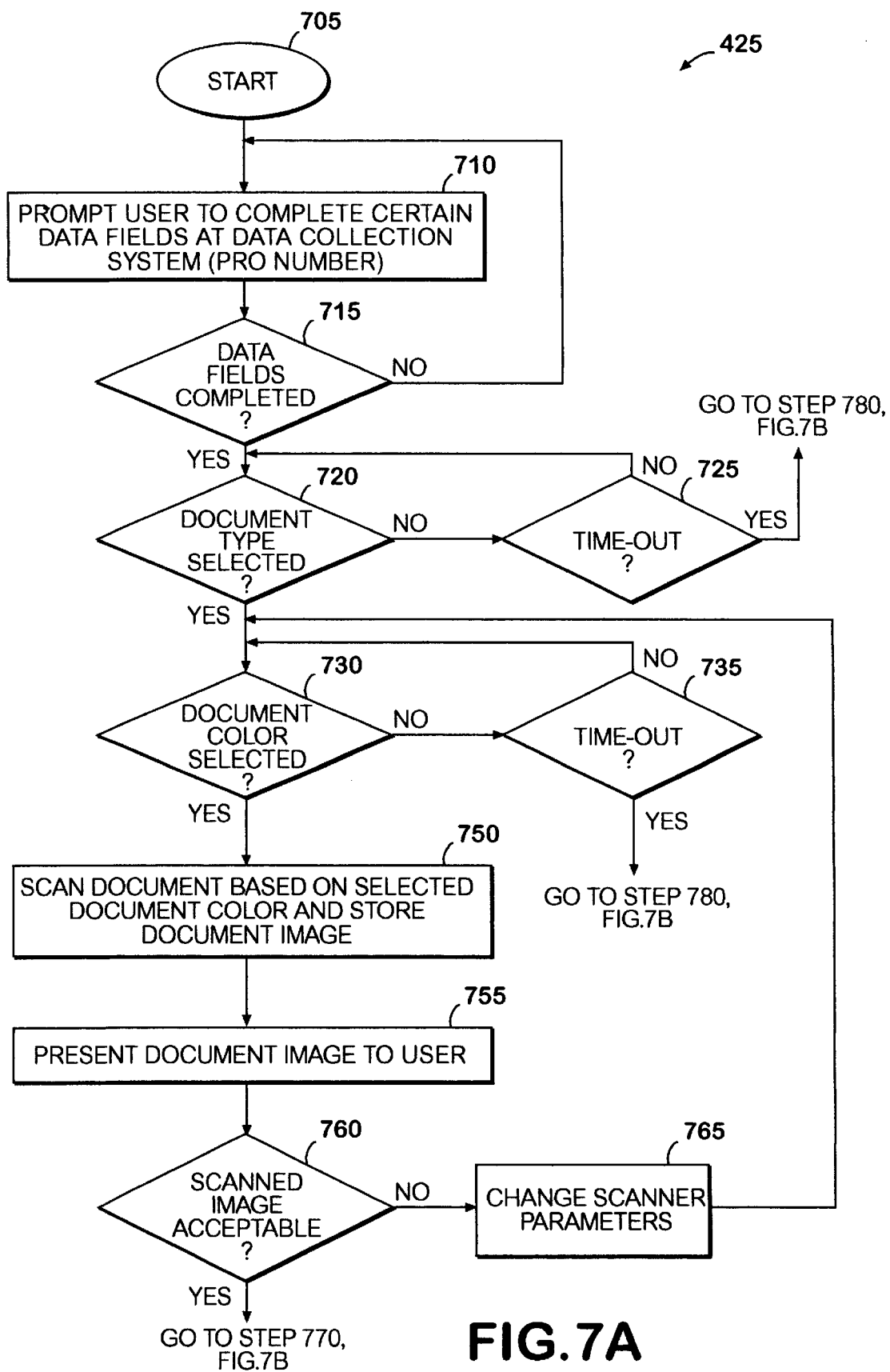
FIGS. 7A and 7B, collectively described as FIG. 7, are logical flowchart diagrams illustrating a computer-implemented process for creating an image of a document in accordance with an exemplary embodiment of the present invention.
Figure 7B:
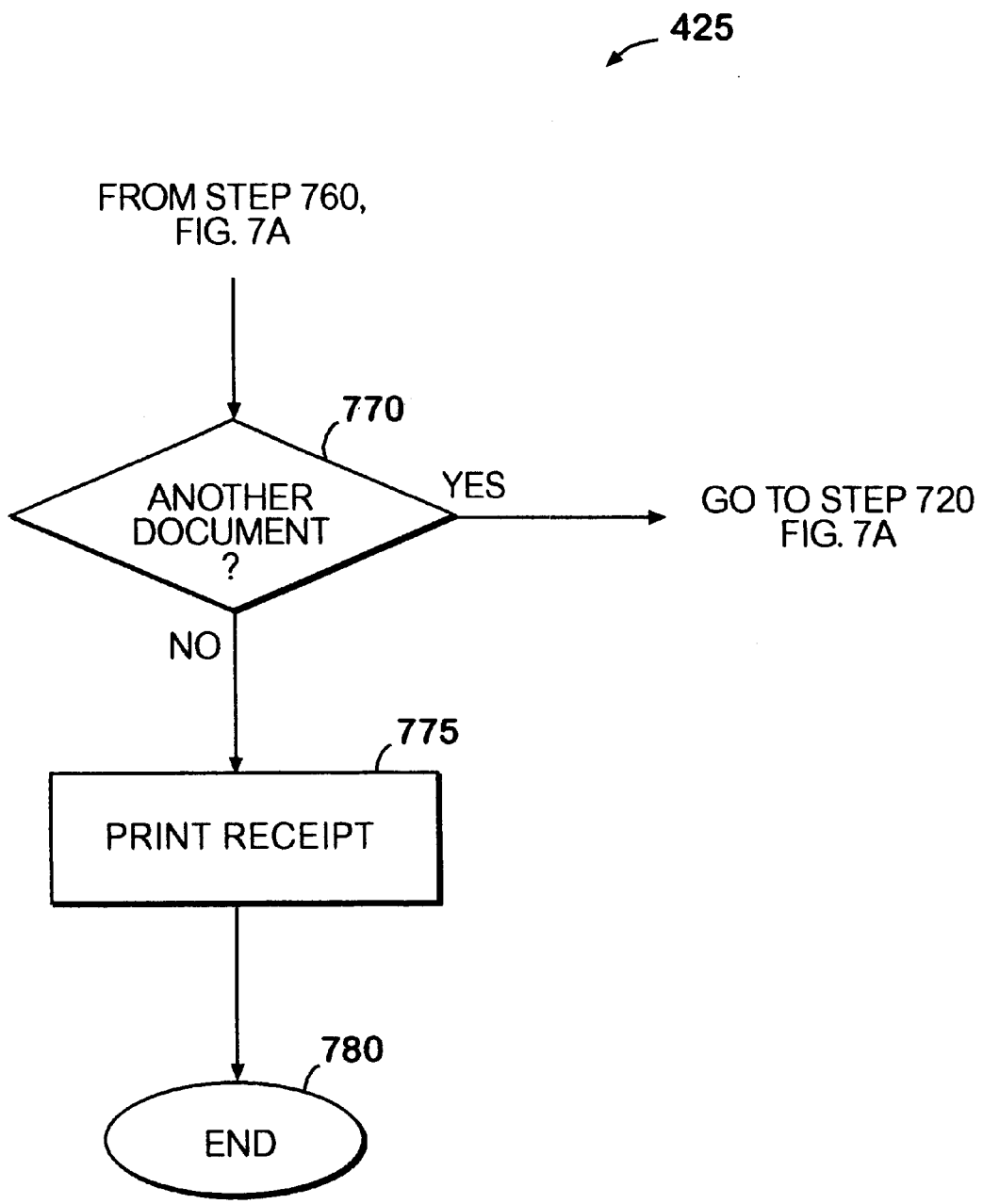

FIGS. 7A and 7B, collectively described as FIG. 7, are logical flowchart diagrams illustrating an exemplary computer-implemented process for completing the task 425 (FIG. 4) for inputting document information at the data collection system. The process 425 is initiated at the START step 705 and proceeds to step 710, in which the user is prompted to complete one or more data fields presented by a display screen of the data collection system 105. For the representative transportation industry application, the user is a transportation carrier's driver and the requested information typically comprises a PRO number. Using the touch screen of the data collection system 105, the driver can enter one or more alphanumeric characters to complete entry of the requested data, such as the PRO number, at the first display screen. A determination is made in step 715 to inquiry whether each data field for the requested information has been completed by the user. If the response to this inquiry is negative, the "NO" branch is followed to step 710 and data entry continues. Otherwise, the entered data is stored in system memory and the "YES" branch is followed to step 715 because the user has completed entry of the requested data, typically by pressing by ENTER key on the touch-screen. For the exemplary data collection system 105, a second display screen, typically described as the scanning display, is now presented to the user.

An inquiry is conducted at step 720 to determine whether the user has selected a document type from a scrollable list presented by the scanning display screen. If the response to this inquiry is negative, a determination is made in step 725 to inquire whether the time period for document type selection has expired. If so, the method 425 proceeds to the END step 780 and terminates. Otherwise, the "NO" branch is followed from step 725 to step 720.

In the event that the user has selected a document type in step 720, this entered data is stored in system memory and the "YES" branch is followed to step 730. An inquiry is conducted in step 730 to determine whether the user has selected a control associated with an identified color from the scanning display screen. If the response to this inquiry is negative, a determination is made in step 735 to inquire whether the time period for selecting a color-labeled control of the scanning display screen has expired. If so, the process 425 proceeds to the END step 780 and terminates. Otherwise, the "NO" branch is followed from step 735 to step 730 to determine whether the user is now ready to scan the document based on the color of that document.

In response to the selection in step 730 of a control associated with the color of the document to be scanned, the "YES" branch is followed from step 730 to step 750. The document is scanned by the image scanning device in step 750 based on the set of predetermined scanning parameters associated with the color of the document to be scanned. The document image resulting from this scanning operation can be maintained within memory at the computer of the data collection system 105. From a user's view, this document scanning operation represents a relatively simple task because the control parameters for the image scanning device are automatically selected based upon the user's selection of a control labeled with the color of the document to be scanned. This set of control parameters has been selected well in advance of field operations for the data collection system 105 based upon empirical measurements that defined a set of control parameters resulting in the generation of a high quality document image for a document having a selected document color.

In step 755, the scanning display screen presents the document image to the user for review. An inquiry is conducted in step 760 to determine whether the document image is acceptable to the user. If the response to this inquiry is negative, the "NO" branch is followed from step 760 to step 765, in which the user can decline to accept the document image. If the user indicates that the document image is not satisfactory, then the data collection system 105 can present a display screen to enable the user to indicate the nature of the document image problem, such as scan darker, scan lighter, bad document type, bad PRO number, etc. For example, the user can change the control parameters for the image scanning device by selecting another control labeled with a related document color in step 730. If the document image is acceptable, however, the "YES" branch is followed from step 760 to step 770.

In step 770, shown in FIG. 7B, an inquiry is conducted to determine whether the user desires to scan another document. If so, the "YES" branch is followed from step 770 to step 720 to determine whether the document type for that document has been selected. Otherwise, in response to a determination that the user has no other documents to be scanned, the "NO" branch is followed to step 775 and a receipt is printed by the data collection system 105 to document this transaction for the user. The process 425 terminates at the END step 780.

Figure 8A:
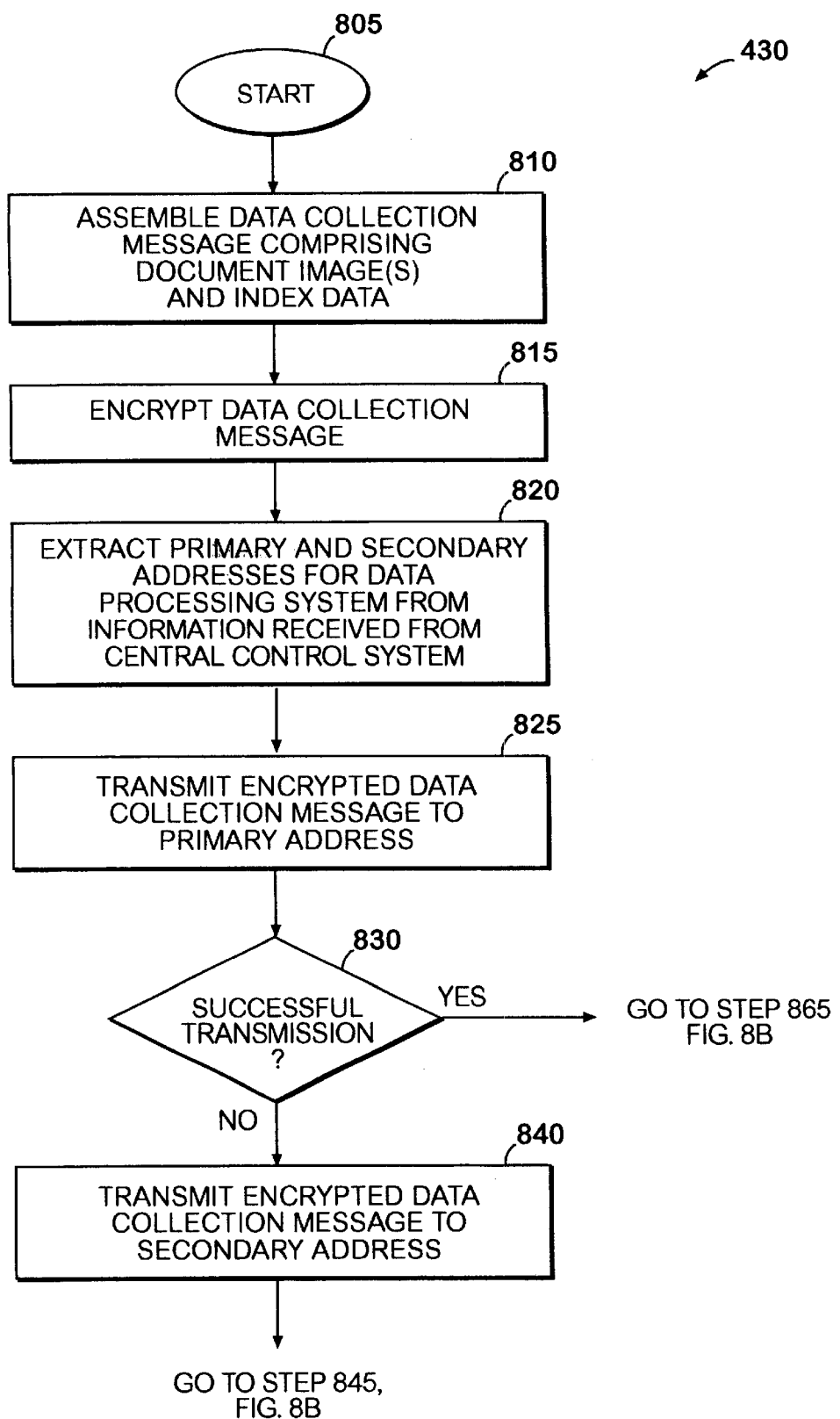
FIGS. 8A and 8B, collectively described as FIG. 8, are logical flowchart diagrams illustrating a computer-implemented process for communicating with a data processing system by a data collection system in accordance with an exemplary embodiment of the present invention.
Figure 8B:
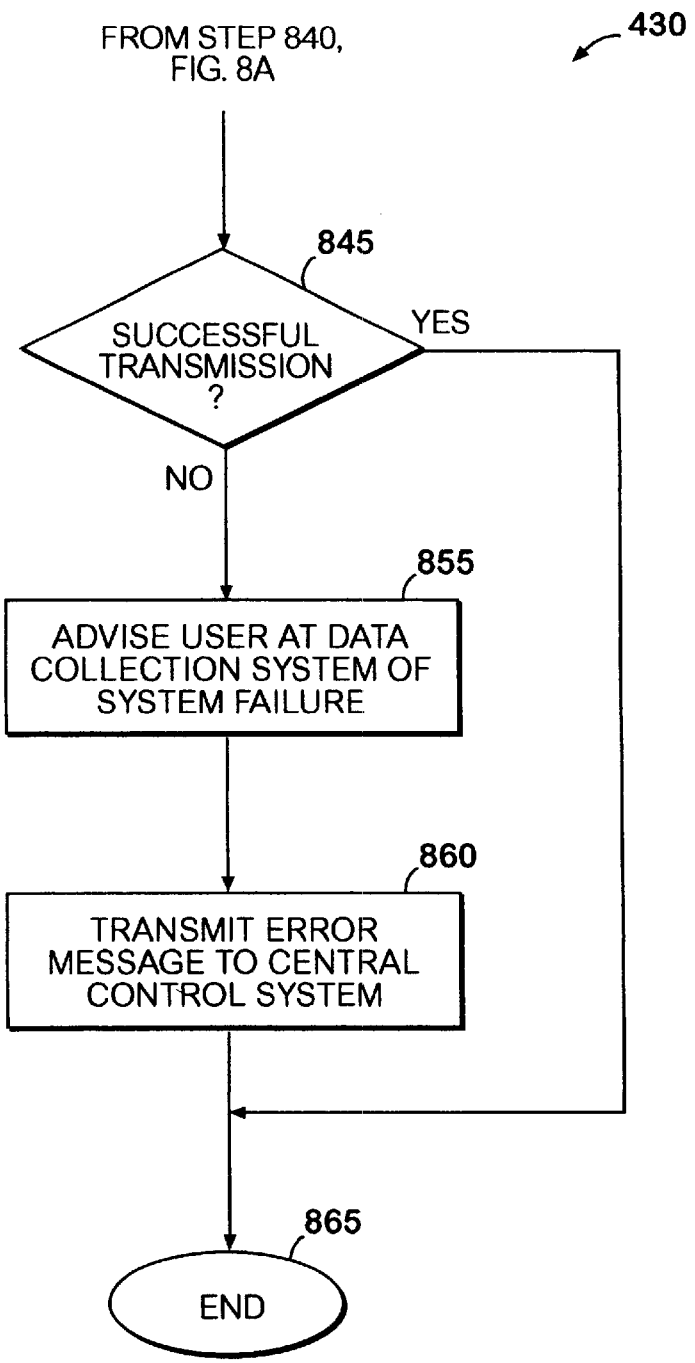

FIGS. 8A and 8B, collectively described as FIG. 8 are logical flowchart diagrams that illustrate an exemplary computer-implemented process for completing the task 430 (FIG. 4) for transmitting a data message from a data collection system 105 to a designated data processing system 115. The process 430 begins at the START step 805 and proceeds to step 810, in which a data message is assembled for transmission to the designated data processing system 115. For the representative transportation industry application, the designated data processing system 115 is a transportation billing center that processes shipping documents and prepares invoices to collect payment for completed shipments. The data message typically comprises one or more indexed images of transportation industry documentation, such as bills of lading, and related index data for such document image(s). This data message can be encrypted in step 815 to insure a secured communication between the data collection system 105 and the designated data processing system 115.

In step 820, the primary address and one or more secondary addresses, if any, for the data processing system are extracted from the information previously provided by the central control system 110 to the data collection system 105. The data collection system 105 then establishes a computer network connection and transmits the encrypted data message to the primary address in step 825.

In step 830, a determination is made to inquiry whether the transmission of the data message to the primary address is successful. If so, the "YES" branch is followed to the END step 865 and terminates. If, however, the transmission of the data message is not successful, the "NO" branch is followed from step 830 to step 840.

In step 840, the data collection system 105 transmits the encrypted data message to a secondary address (if available). In step 845, an inquiry is conducted to determine whether the transmission of the encrypted data message to the secondary address has been successfully completed. If so, the "YES" branch is followed to the END step 865 and terminates.

If the transmission to the secondary address is not successful, the "NO" branch is followed from step 845 to step 855. The data collection system 105 advises the user in step 855 of the message transmission failure. In turn, the data collection system 105 can transmit an error message to the central control system 860 via the distributed computer network 120. The process then terminates at the END step 865.

Figure 9:
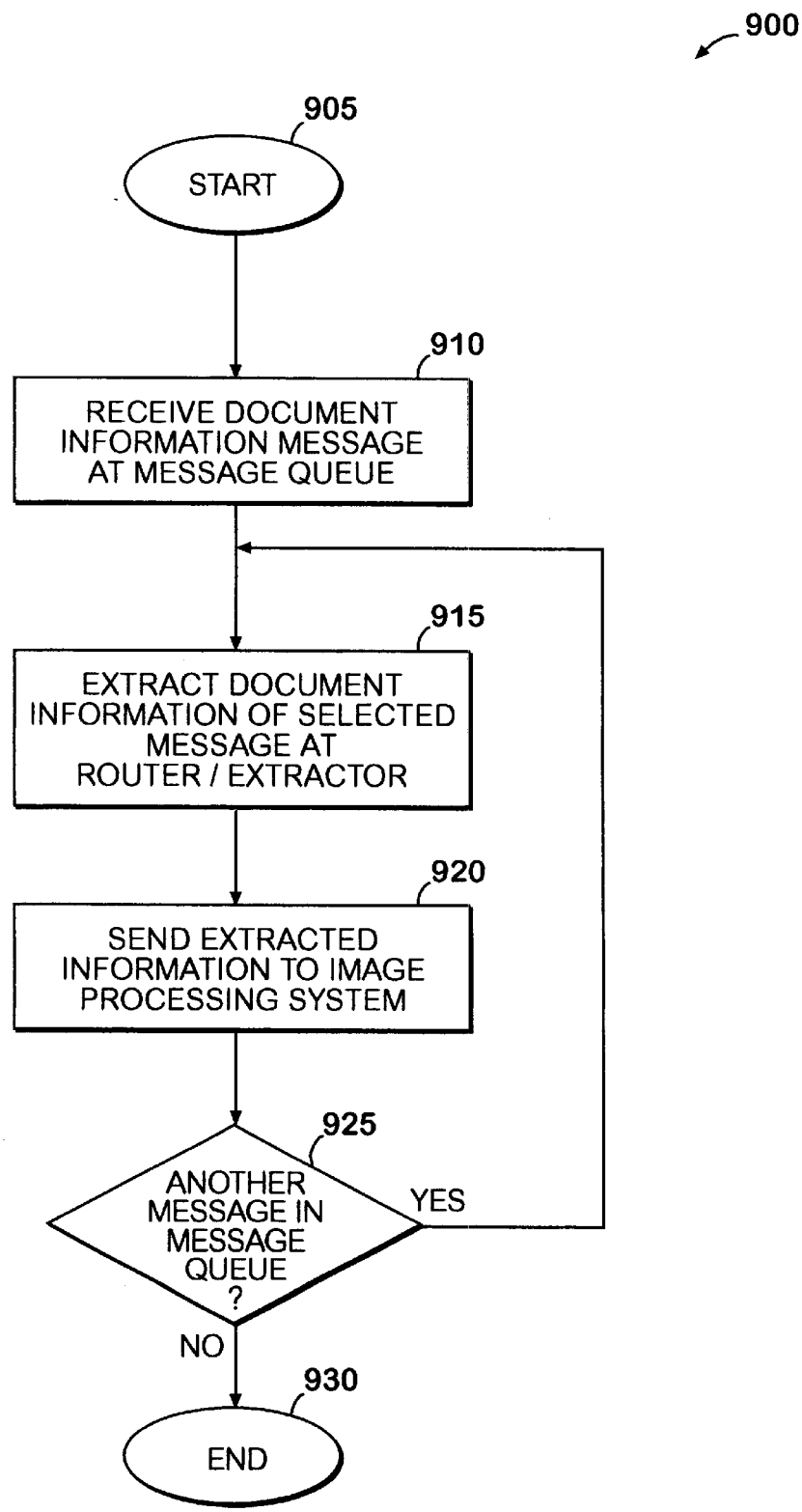
FIG. 9 is a logical flowchart diagram illustrating a computer-implemented process for processing information received by a data processing system from a data collection system in accordance with an exemplary embodiment of the present invention.

FIG. 9 is a logical flowchart diagram illustrating an exemplary computer-implemented process for processing a data message at a data processing system. Turning now to FIG. 9, the process 900 begins at the START 905 and proceeds to step 910, in which a data message is received by the message queue of the data processing system 115. In step 915, the document information, including document images and available indexing information, can be extracted from the data message by an extraction system for router. The extracted document information is output by the extraction system to an image processing system in step 920. The image processing system supports the processing of each document image and the related indexing information obtained from the data message. In the event that a determination is made in step 925 that another message remains within the message queue, the "YES" branch is followed from step 925 to step 915 to obtain the data message from the message queue. Otherwise, the "NO" branch is followed from step 925 to END step 930. The process 900 then terminates at the END step 930.

In view of the foregoing, it will be appreciated that the present invention provides a mechanism for communicating document images and related information from a data collection system to a selected data processing system based on identifying information transmitted by a central control system to the data collection system.

The present invention may be conveniently implemented in one or more program modules that are based upon and implement the features illustrated in FIGS. 4–9. No particular programming language has been described for carrying out the various procedures described above. It is considered that the operations, steps, and procedures described above and illustrated in the accompanying drawings are sufficiently disclosed to enable one of ordinary skill in the art to practice the present invention. However, there are many computers, operating systems, and application programs which may be used in practicing the present invention and, therefore, no detailed computer program could be provided which would be applicable to all of these many different systems. Each user of a particular computer will be aware of the language and tools which are most useful for that user's needs and purposes. In addition, although the invention was described in the context of a transportation industry application, those skilled in the art will appreciate that the invention can be extended to the collection and the communication of a wide variety of data types. This should be understood that foregoing relates only to specific embodiments of the present invention, and that numerous changes may be made therein without departing from the spirit and scope of the invention as defined by the following claims.

We claim:

1. A data communications system, comprising:

a plurality of data collection systems, each connected to a distributed computer network and operative to collect document information based on the color of a document and to transmit a data collection message comprising the document information via the distributed computer network;

a plurality of data processing systems, each connected to the distributed computer network and operative to receive the data collection message via the distributed computer network and to extract the document information from the data collection message; and a central control system, connected to the distributed computer network, operative to transmit an authorization message via the distributed computer network in response to receiving a data source message from a selected one of the data collection systems, the data source message comprising an identifying characteristic of a source for the document information, the authorization message comprising an address identifying one of the data processing systems for receiving the data collection message based on the identifying characteristic of the source of the document information, document index information, and at least one data entry field defining document-related information to be entered at the selected data collection system, wherein the selected data collection system is operative to collect the document-related information in response to presentation of the at least one data entry field defining the document-related information to be entered at the selected data collection system and to create an electronic image of the document based on the color of the document prior to transmission of the data collection message, the selected data collection system further operative to present the electronic document image for verification prior to transmission of the document information to the identified data processing system by presenting the electronic document image for review, determining whether the electronic document image is acceptable, and in the event that the electronic document image is acceptable, then generating the data collection message comprising the electronic document image, the document-related information, and document index information, otherwise, the selected data collection system creates another electronic image of the document based on a selection of an alternative color for the document, the selected data system further operative to transmit the data collection message to the data processing system having the address identified by the authorization message.

2. The data communications system of claim 1, wherein each data collection system comprises:

a computer, coupled to the distributed computer network, for controlling the collection of document information and communications with the central control system and the identified data processing system;

an input device, coupled to the computer, for entering the identifying characteristic of the source of the document information;

an image scanner device, coupled to the computer, for generating the electronic document image based on the color of the document;

and a second input device, coupled to the computer, for entering a selection of the document color in response to a user's selection of a control corresponding to the document color.

3. The data communication system of claim 2, wherein the second input device comprises a plurality of input keys, each corresponding to a certain color of a document type and representing a control item assigned a set of predetermined scanner parameters for controlling document image creation operations by the image scanner device based on the document color.

4. The data communication system of claim 3, wherein the set of predetermined scanner parameters is selected prior to field operations of the data collection system based upon empirical measurements that support a determination of the best scanner parameters for the document color.

5. The data communication systems of claim 1, wherein the central control system comprises:

a central control server, coupled to the distributed computer network, for communicating with each of the data collection systems; and a central control database, coupled to the central control server, for maintaining database records defining a relationship between the identifying characteristic of each source of the document information and the address identifying one of the data processing systems for receiving the data collection message and the document index information.

6. The data communications system of claim 5, wherein the central control server, responsive to receipt of the date source message from the selected data collection system, is operative to generate the authorization message by searching the central control database based on the identifying characteristic of the source of the document information to locate the address identifying the data processing system for receiving the data collection message and the document index information.

7. The data communications system of claim 6, wherein central control database further maintains database records defining a relationship between the identifying characteristic of each source of the document information and the at least one data entry field defining the document-related information to be entered at the selected data collection system, and the central control server is operative to search the central database based on the identifying characteristic to locate the at least one data entry field to complete the generation of the authorization message.

8. The data communications system of claim 1, wherein the data processing system comprises:

a message queue, coupled to the distributed computer network, operative to receive the data collection message from the selected data collection system, each data collection message maintained within a queue prior to subsequent processing of the document information;

an extraction system, coupled to the message queue, operative to extract document information from one of the data collection messages in response to accepting the data collection message from the message queue; and an image system, coupled to the extraction system, for processing the extracted document information to generate an indexed reproduction of the corresponding document.

9. The computer-implemented method of claim 1, wherein the document-related information comprises:

a transaction identifier; and an identity of the type of document to be collected at the selected data collection system.

10. A computer-implemented process for communicating document information, comprising the steps:

collecting data source information at a selected one of a plurality of data collection systems connected to a distributed computer network, the data source information identifying the source of the document information to be entered at the selected data collection system;

transmitting from the selected data collection system a data source message comprising at least a portion of the data source information;

responsive to receipt of at least the portion of the data source information at a central control system coupled to the distributed computer network, determining whether the source for the document information is authorized to input the document information at the selected data collection system;

if authorized, then identifying one of a plurality of data processing systems coupled to the distributed computer network for receiving a data collection message based on the portion of the data source information and transmitting from the central collection system an authorization message comprising an identifier for the identified data processing system, document index information, and at least one data entry field defining document-related information to be entered at the selected data collection system prior to transmission of the data collection message;

responsive to receipt of the authorization message, collecting the document information at the selected data collection system by collecting the document-related information in response to a presentation of the at least one data entry field defining the document-related information to be entered at the selected data collection system, creating an electronic image of a document based on the color of the document, and presenting the electronic document image for verification prior to transmission of the document information to the identified data processing system; and transmitting from the selected data collection system the data collection message comprising the document information to the identified data processing system, wherein the step of presenting the electronic document image for verification comprises:

(a) presenting the electronic document image for review;

(b) determining whether the electronic document image is acceptable; and (c) in the event that the electronic document image is acceptable, then generating the data collection message comprising the electronic document image, the document-related information, and the document index information, otherwise, creating another electronic image of the document based on a selection of an alternative color for the document and repeating steps (a)–(c).

11. The computer-implemented method of claim 10 further comprising, prior to creating the electronic document image, the steps of:

identifying the color of the document; and selecting a set of predetermined scanner parameters for controlling the creation of the electronic document image based on the identified color for the document, wherein the set of predetermined scanner parameters is selected prior to operation of the selected data collection system based upon empirical measurements that support a determination of the best scanner parameters for the document color.

12. The computer-implemented method of claim 10, wherein the step of collecting data source information at the selected data collection system comprises reading a magnetic card to obtain the data source information identifying the source of the document information to be entered at the selected data collection system.

13. The computer-implemented method of claim 10, wherein the data source information comprises a unique identifier identifying a party desiring to enter document information at the selected data collection system.

14. The computer-implemented method of claim 13, wherein the data source message comprises the unique identifier identifying the party, and the step of determining whether the source for the document information is authorized to input the document information at the selected data collection system comprises parsing the data source message to obtain the unique identifier for the party and searching a database at the central control system to locate a record comprising the unique identifier.

15. The computer-implemented method of claim 14, wherein the step of identifying one of the data processing systems comprises:
   locating the record comprising the unique identifier identifying the party; and
   based on the record, obtaining the identifier for the identified data processing system, the identifier comprising a network address for the identified data processing system.

16. The computer-implemented method of claim 10, wherein the document-related information comprises:
   a transaction identifier; and
   an identity of the type of document to be collected at the selected data collection system.

17. The computer-implemented method of claim 10 further comprising the step of printing a receipt to create a record of a data collection task in response to verifying that the electronic document image is acceptable.

18. The computer-implemented method of claim 10 wherein the step of transmitting the data collection message comprises:
   encrypting content of the data collection message;
   extracting the identifier comprising a network address of the identified data processing system from the authorization message received by the selected data collection system from the central control system; and
   transmitting the data collection message to the identified data processing system.

19. The computer-implemented method of claim 10 further comprising the steps of:
   receiving the data collection message at the identified data processing system;
   extracting the document information from the data collection message; and
   processing the extracted document information to generate an indexed reproduction of the corresponding document.

20. A data collection system for collecting document information and communicating via a distributed computer network with a central control system and a selected one of a plurality of data processing systems operative to process the document information, the central control system operative to authorize the data collection system to communicate with the selected data processing system, the data collection system comprising:
   a computer, coupled to the distributed computer network, for controlling the collection of document information and communications with the central control system and the selected data processing system;
   a first input device, coupled to the computer, for entering an identifying characteristic of a source for the document information;
   an image capture device, coupled to the computer, for generating an electronic document image of a document based on the color of the document; and
   a second input device, coupled to the computer, for selecting the scanning parameters for the image scanner in response to a selection of the color of the document;
   an output device for presenting visual information regarding the collection of the document information,
   the computer operative to collect document-related information in response to a presentation on the output device of at least one data entry defining the document-related information to be entered at the second input device;
   the computer further operative to present the eletronic document image on the output device for verification prior to transmission of the document information to the selected data processing system by presention the electronic document image on the output device for review, determining whether the electronic document image is acceptable; and in the event that the electronic document image is acceptable, then generating a data collection message comprising the electronic document image, the document-related information, and document index information, otherwise, the selected data collection system creates another electronic image of the document based on a selection of an alternative color for the document
   the computer further operative to generate the data collection message is response to receiving authorization from the central control system to communicate with the selected data processing system based on the identifying characteristic of the source for the document information and to transmit the data collection message to the selected data processing system via the distributed computer network.

21. The data collection system of claim 20, wherein the second input device comprises a touch-screen interface for the output display device, the touch-screen interface comprising a plurality of control items, each corresponding to a possible color of the document and assigned a set of predetermined scanning parameters to control the generation of the electronic document image by the image capture device.

22. The data collection system of claim 21, wherein the set of predetermined scanner parameters is selected prior to field operations of the data collection system based upon empirical measurements that support a determination of the best scanner parameters for the possible document color.

23. The data collection system of claim 22, wherein the image capture device comprises an image scanner operative to generate the electronic document image by scanning the document in response to the selection of one of the control items corresponding to the color of the document, the scanning operation conducted by the image scanner based on the set of predetermined scanning parameters associated with the selected control item.

24. The data collection system of claim 20, wherein the first input device comprises a magnetic card reader for reading encoded data stored on a magnetic card and comprising the identifying characteristic of a source of the document information.

25. The data collection system of claim 20 further comprising a printer for printing a transaction record in response to completion of the collection of document information at the data collection system.

26. The data collection system of claim 20, wherein the document-related information comprises a unique transaction identifier and a type of the document to be captured by the image capture device.

27. The data collection system of claim 20, wherein the computer is further operative to transmit a data source message via the distributed computer network to the central control system in response to receiving from the first input device the identifying characteristic for the source of the document information, the data source message comprising the identifying characteristic and an identifier for the data collection system.

28. The data collection system of claim 27, wherein the computer is further operative to receive an authorization message from the central control system via the distributed computer network, the authorization message comprising an identifier identifying the selected data processing system for receiving the data collection message based on the identifying characteristic for the source of the document information and the document indexing information.

29. A computer-implemented process for communicating document information, comprising the steps:

collecting data source information at a selected one of a plurality of data collection systems connected to a distributed computer network, the data source information comprising a unique identifier identifying a party desiring to enter document information at the selected data collection system;

transmitting from the selected data collection system a data source message comprising at least the unique identifier identifying the party;

responsive to receipt of at least the portion of the data source information at a central control system coupled to the distributed computer network, determining whether the source for the document information is authorized to input the document information at the selected data collection system by parsing the data source message to obtain the unique identifier for the party and searching a database at the central control system to locate a record comprising the unique identifier;

if authorized, then identifying one of a plurality of data processing systems coupled to the distributed computer network for receiving a data collection message by locating the record comprising the identity of the party and, based on the record, obtaining the identified data processing system, transmitting from the central collection system an authorization message comprising an address for the identified data processing system, document index information, and at least one data entry field defining document-related information to be entered at the selected data collection system prior to transmission of the data collection message;

responsive to receipt of the authorization message, collecting the document information at the selected data collection system by collecting the document-related information in response to a presentation of the at least one data entry field defining the document-related information to be entered at the selected data collection system, creating an electronic image of a document based on the color of the document, and presenting the electronic document image for verification prior to transmission of the document information to the identified data processing system; and transmitting from the selected data collection system the data collection message to the identified data processing system, wherein the step of presenting the electronic document image for verification comprises:
(a) presenting the electronic document image for review;
(b) determining whether the electronic document image is acceptable; and
(c) in the event that the electronic document image is acceptable, then generating the data collection message comprising the electronic document image, the document-related information, and the document index information, otherwise, creating another electronic image of the document based on a selection of an alternative color for the document and repeating steps (a)–(c).

30. The computer-implemented method of claim 29 further comprising, prior to creating the electronic document image, the steps of:

identifying the color of the document; and selecting a set of predetermined scanner parameters for controlling the creation of the electronic image of the document based on the identified color for the document, wherein the set of predetermined scanner parameters is selected prior to operation of the selected data collection system based upon empirical measurements that support a determination of the best scanner parameters for the document color.

31. The computer-implemented method of claim 29, wherein the step of collecting data source information at the selected data collection system comprises reading a magnetic card to obtain the data source information identifying the source of the document information to be entered at the selected data collection system.

* * * * *